United States Patent
Hare et al.

(10) Patent No.: US 7,415,868 B2
(45) Date of Patent: Aug. 26, 2008

(54) DECONVOLVING TIP ARTIFACTS USING MULTIPLE SCANNING PROBES

(75) Inventors: Casey Patrick Hare, Santa Barbara, CA (US); Andrew Norman Erickson, Santa Barbara, CA (US)

(73) Assignee: Multiprobe, Inc., Santa Barbara, CA (US)

( * ) Notice: Subject to any disclaimer, the term of this patent is extended or adjusted under 35 U.S.C. 154(b) by 0 days.

(21) Appl. No.: 11/385,102

(22) Filed: Mar. 20, 2006

(65) Prior Publication Data

US 2007/0084273 A1 Apr. 19, 2007

Related U.S. Application Data

(60) Provisional application No. 60/663,978, filed on Mar. 21, 2005.

(51) Int. Cl.
*G01B 5/28* (2006.01)
(52) U.S. Cl. .......................... 73/105; 250/306; 250/307
(58) Field of Classification Search ................... 73/105; 250/306, 307
See application file for complete search history.

(56) References Cited

U.S. PATENT DOCUMENTS

| | | | |
|---|---|---|---|
| 6,196,061 B1 * | 3/2001 | Adderton et al. | 73/105 |
| 6,545,273 B1 * | 4/2003 | Singh et al. | 250/306 |
| 6,545,492 B1 * | 4/2003 | Altmann et al. | 324/754 |
| 6,684,686 B2 * | 2/2004 | Itsuji et al. | 73/105 |
| 6,951,130 B2 * | 10/2005 | Hare et al. | 73/105 |
| 2002/0189330 A1 * | 12/2002 | Mancevski et al. | 73/105 |
| 2004/0025578 A1 * | 2/2004 | Hare et al. | 73/105 |
| 2007/0022804 A1 * | 2/2007 | Kley | 73/105 |

* cited by examiner

*Primary Examiner*—Michael Cygan
(74) *Attorney, Agent, or Firm*—Felix L. Fischer

(57) ABSTRACT

The present invention comprises an apparatus and a method for using multiple scanning probes to deconvolve tip artifacts in scanning probe microscopes and other scanning probe systems. The invention uses multiple scanning probe tips of different geometries or orientations to scan a feature, such as a semiconductor line or trench, and to display the scan data such that tip artifacts from each tip can be omitted from the measurement by data from the other tips.

16 Claims, 43 Drawing Sheets

DECONVOLVING TIP ARTIFACTS USING MULTIPLE SCANNING PROBES

REFERENCES TO RELATED APPLICATIONS

This application claims priority of U.S. Provisional Patent Application Ser. No. 60/663,978 filed on Mar. 21, 2005 having the same title as the present application.

BACKGROUND

1. Field of Invention

This invention generally relates to scanning probe microscopy (SPM) and, more specifically, the use of multiple scanning probes to deconvolve probe tip artifacts.

2. Description of the Related Art

In the semiconductor industry, device densities have been continuously increasing. To support this increase in density the devices and all supporting structure must become proportionately smaller. The ability to control semiconductor processes often relies on the ability to measure increasingly small features, such as lines, trenches, pits and plugs. As these features become smaller the features become increasingly more difficult to measure.

The prior art contains many different techniques to achieve this measurement. Optical techniques using visible light such as the creation of a diffraction pattern or use of a spectroscope were effective at large semiconductor device geometries and are well covered in the prior art. However, as device geometries shrank past the wavelength of visible light, these techniques were no longer able to successfully make the needed measurements.

Charged beam techniques, such as scanning electron microscopy (SEM) or focused ion beam (FIB) instruments are another way to achieve the desired measurements. These tools have some drawbacks, such as requiring vacuum and exposing the sample to charged beams, but they have the resolution to make the needed measurements. However, for features with near-vertical, vertical or reentrant sidewalls, such as trenches or lines, the single beam generator is not sufficient to measure the complete feature as the beam is obscured by another part of the feature of interest. In response to this drawback, multiple beam solutions have been presented, but these add significant cost and difficulty in their practical application.

Scanning probe microscopy (SPM), including the specific implementation of atomic force microscopy (AFM), is well understood in the field, and is also a potential method for achieving the desired measurements. The prior art has many implementations of performing such measurements using an AFM. Examples of such implementations include scanning the feature with the AFM or using a profiler to locate the features and then scanning them with the AFM. There are many prior art examples of using multiple tips on the same cantilever such as using 2 AFM probes serially, the first for a coarse scan and a second, sharper probe for a finer scan or using a single beam on a cantilever between 2 tips to take a differential height measurement. However, no matter which of these methods is used, the geometry of the AFM tip will create tip artifacts and prevent accurate imaging of the sides of the feature, as is also well documented in the prior art.

Different AFM tip geometries are also well documented in the prior art. Examples of such tip geometries include the conical probe tip, the cylindrical probe tip and the "boot" probe tip. Probe tip geometries and the artifacts they generate are of particular interest for lines and trenches. FIG. 1a shows a conical probe tip 10. In FIG. 1b the conical probe tip 10 scans over a line 12 and produces scan data 14; the scan data 14 contains tip artifacts 16 from the taper of the probe tip that does not completely accurately represent the topography of the line 10. FIG. 1c shows the conical probe tip 10 scanning over a trench 18 and producing scan data 20; the scan data 20 also contains tip artifacts 22 from the taper of the probe tip that does not completely accurately represent the topography of the trench 18. Note that the vertical sidewalls are not measured. FIG. 2a shows a cylindrical probe tip 24. In FIG. 2b the cylindrical probe tip 24 scans over a line 26 and produces scan data 28; the scan data 28 contains tip artifacts 30 from the body of the probe tip that does not completely accurately represent the topography of the line 26. FIG. 2c shows the cylindrical probe tip 24 scanning over a trench 32 and producing scan data 34; the scan data 34 also contains tip artifacts 36 from the body of the probe tip that does not completely accurately represent the topography of the trench 32. Note that the vertical sidewalls are not measured. FIG. 3a shows a boot probe tip 38. In FIG. 3b the boot probe tip 38 scans over a line 40 and produces scan data 42; the scan data 42 contains tip artifacts 44 from the body of the probe tip that does not completely accurately represent the topography of the line 40. FIG. 3c shows the boot probe tip 38 scanning over a trench 46 and producing scan data 48; the scan data 48 also contains tip artifacts 50 from the body of the probe tip does not completely accurately represent the topography of the trench 46. Note that bottom of the trench and the top of the line are not measured. FIG. 4a shows a triple probe tip 52. In FIG. 4b the triple probe tip 52 scans over a line 54 and produces scan data 56; the scan data 56 contains tip artifacts 58; the scan data 56 contains tip artifacts 58 from the body of the probe tip that does not completely accurately represent the topography of the line 54. FIG. 4c shows the triple probe tip 52 scanning over a trench 60 and producing scan data 62; the scan data 62 also contains tip artifacts 64 from the body of the probe tip does not completely accurately represent the topography of the trench 60. Note that the triple tip is much more difficult to manufacture than the other styles of probe tips.

If the measurement requires accurate imagery of the vertical sidewall of the feature and the measurement of the nominally horizontal surfaces, then more capability is needed. The prior art contains many examples of a probe or a sample tilted to allow measurement of the sidewall and horizontal surface. FIG. 5a shows a step sample 66 being imaged by a probe tip 68 generating scan data 70 that contains tip artifacts 72 and does not accurately represent the step sample 66. FIG. 5b shows the probe tip 68 scanning over a tilted step sample 74 and shows the resulting scan data 76 contains far less tip artifacts and also accurately represents the profile of the tilted step sample 74. FIG. 6 shows a tilted boot tip 78 making a measurement of a step sample 80 and the produced scan data 82 accurately reflects the step sample 80. FIG. 7 shows a single tilted probe 84 measuring the sidewall and bottom of a reentrant trench 86 in several different configurations. However, while each of these methods is capable of measuring a sidewall and the horizontal surface, none of them are capable of measuring both sides of a feature, such as a trench or a line, without changing configurations.

It is therefore desirable to provide the capability to consistently measure the geometry of various features while removing the artifacts present in the measurement of a single tip.

SUMMARY OF THE INVENTION

The present invention provides a device and method to take data with multiple scanning probes such that tip artifacts from one scanning probe are removed from the final measurement data by data from a second probe. This is of particular interest in measuring near-vertical, vertical or reentrant sidewalls along with horizontal or near-horizontal surfaces on the same structure. The probes are either of different geometries or of different orientations such that the tip artifacts of a given tip are not present in a different tip. The invention also discloses a method to display the data such that specific metrics, such as trench depth or width, can be made without the influence of tip artifacts.

In an exemplary embodiment, for a sufficiently sharp and slender leading edge conical probe tip, scanning over a semiconductor trench will give accurate data on one sidewall and a portion of the bottom of the trench. An additional probe of similar geometry located on the opposite side of the sample from the first probe, scanning over the same trench at the same time provides accurate data for the opposite sidewall and an opposite portion of the bottom of the trench. Combining the data from each probe that does not contain the tip artifacts yields accurate measurement of both sidewalls and the bottom of the trench.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The present invention relates to a system and a method of deconvolving tip artifacts in a SPM using multiple scanning probes. Multiple scanning probes scan over a feature that produces tip artifacts. Tips in certain orientations will produce tip artifacts that will not be present in tips that are in different orientations. Therefore scanning with two or more tips can produce a number of images all containing different tip artifacts. The tip artifacts are displayed, compensated for and removed from final measurement data.

Figure 1A:
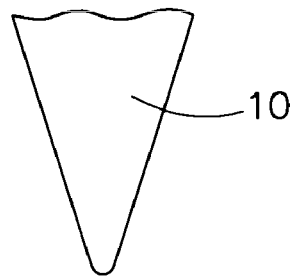
FIG. 1a shows a conical probe tip.
Figure 1B:
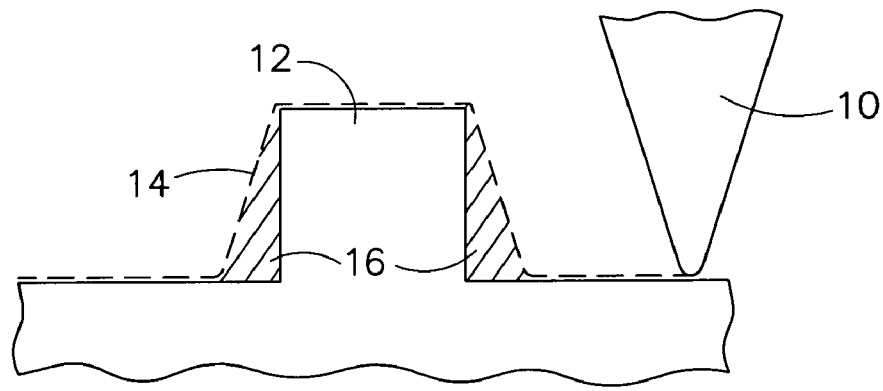
FIG. 1b shows the conical probe tip scanning over a line and producing scan data; with tip artifacts.
Figure 1C:
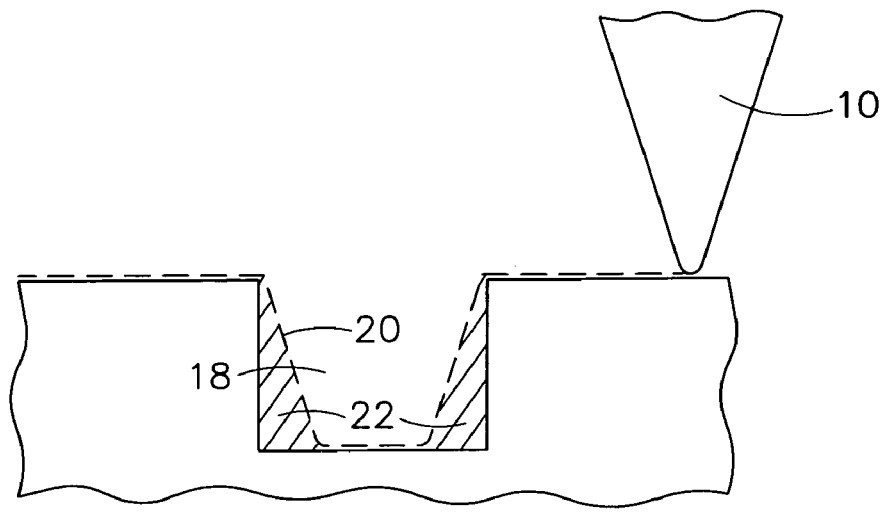
FIG. 1c shows the conical probe tip scanning over a trench and producing scan data with tip artifacts.
Figure 2A:
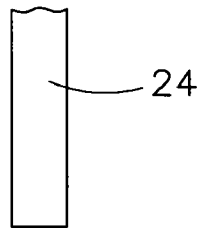
FIGS. 2a-2c show a cylindrical probe scanning the features of interest.
Figure 2B:
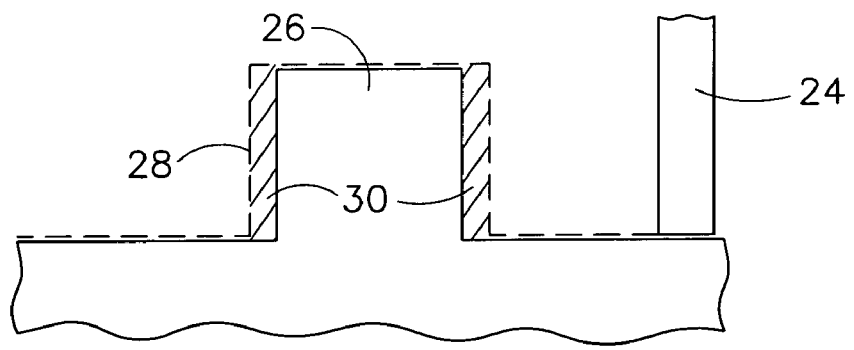
Figure 2C:
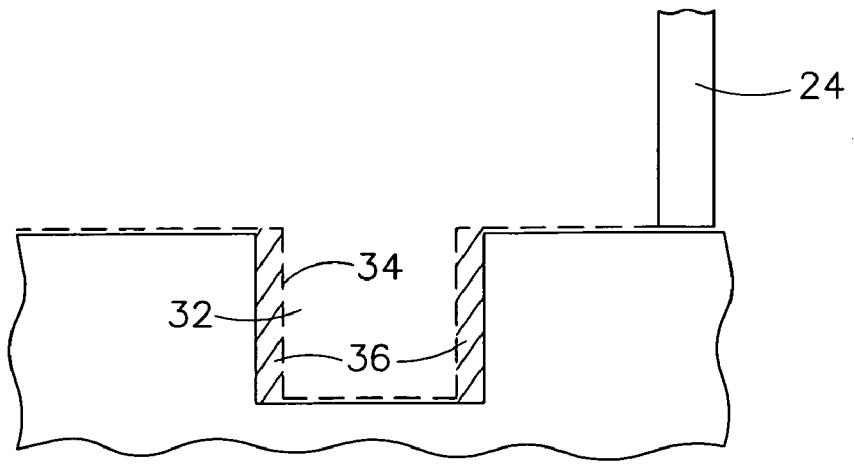
Figure 3A:
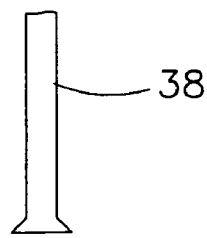
FIGS. 3a-3c show a boot tip probe scanning the features of interest.
Figure 3B:
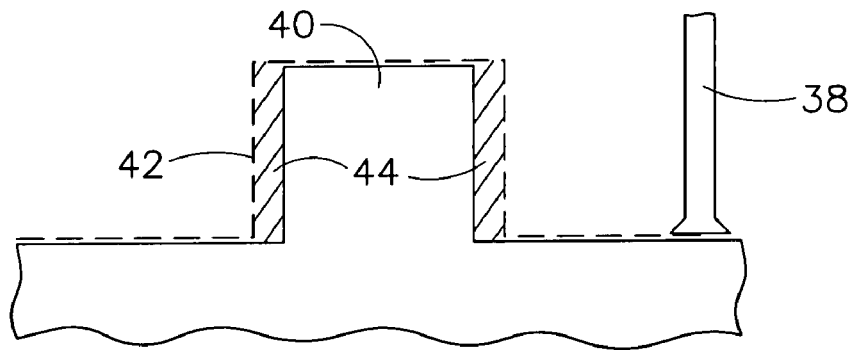
Figure 3C:
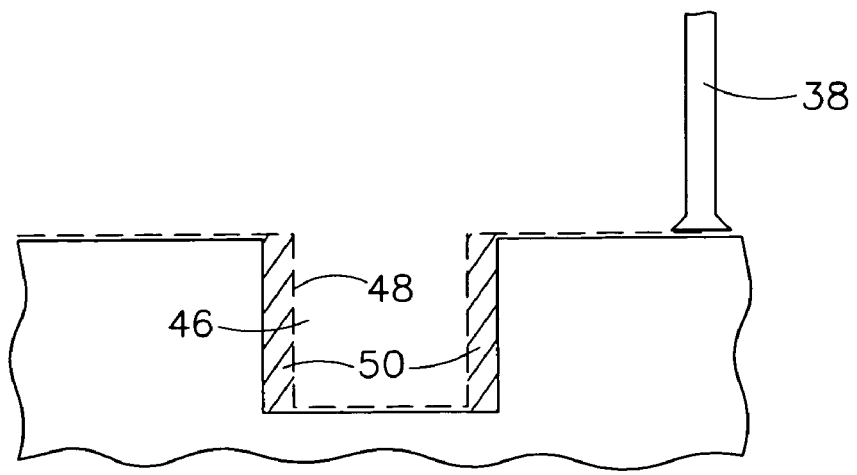
Figure 4A:
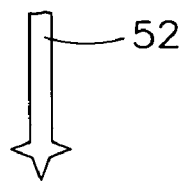
FIGS. 4a-4c show a triple tip probe scanning the features of interest.
Figure 4B:
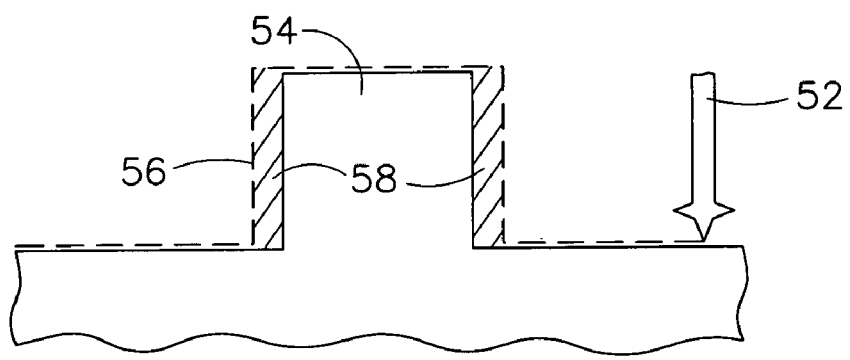
Figure 4C:
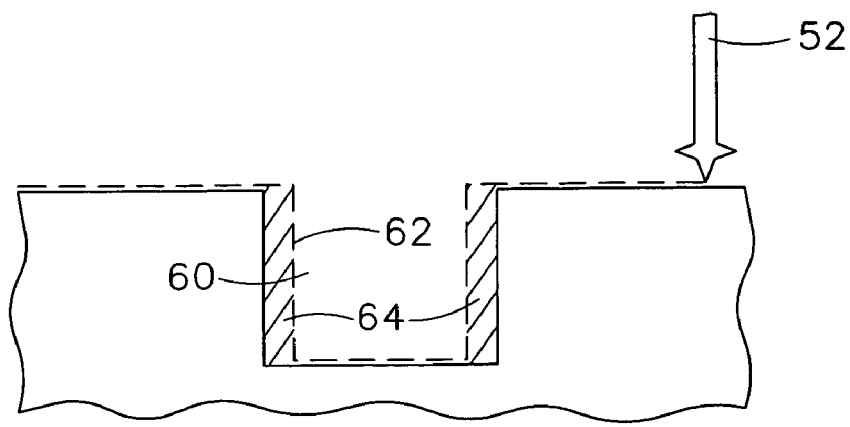
Figure 5A:
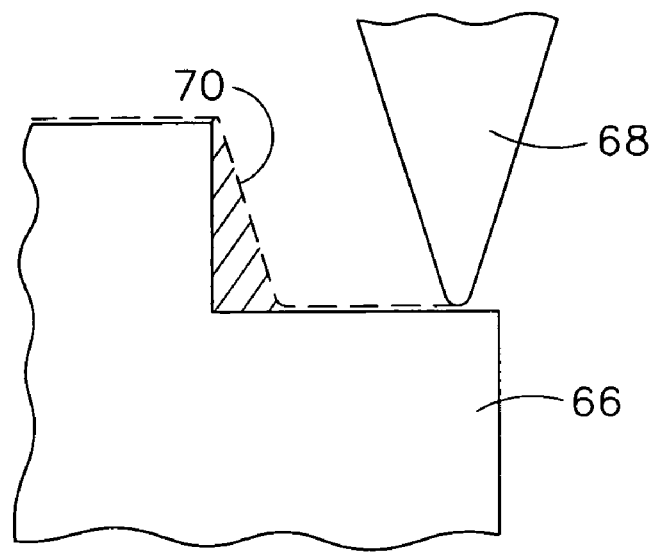
FIG. 5a shows a step sample being imaged by a probe tip generating scan data that contains tip artifacts.
Figure 5B:
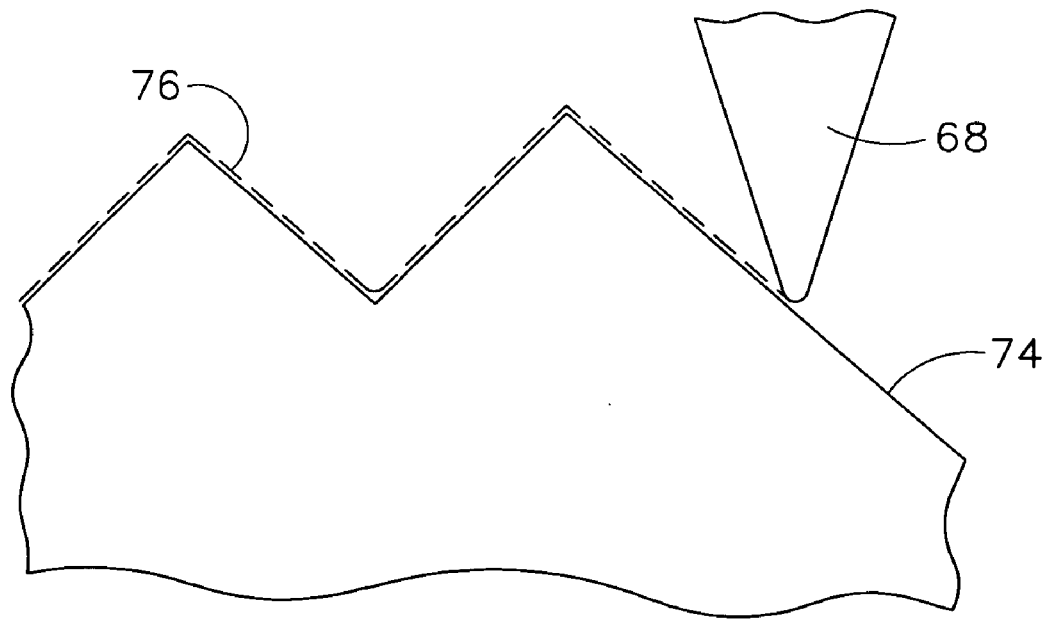
FIG. 5b shows the probe tip scanning over a tilted step sample.
Figure 6:
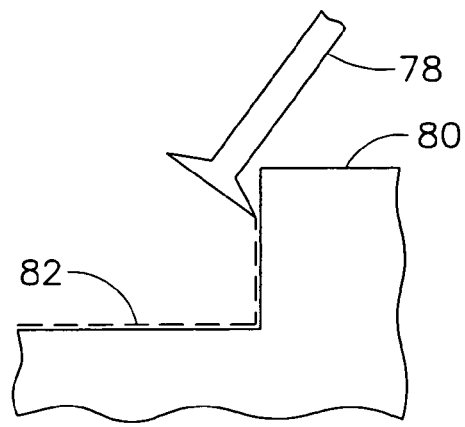
FIG. 6 shows a tilted boot tip making a measurement over a step sample.
Figure 7:
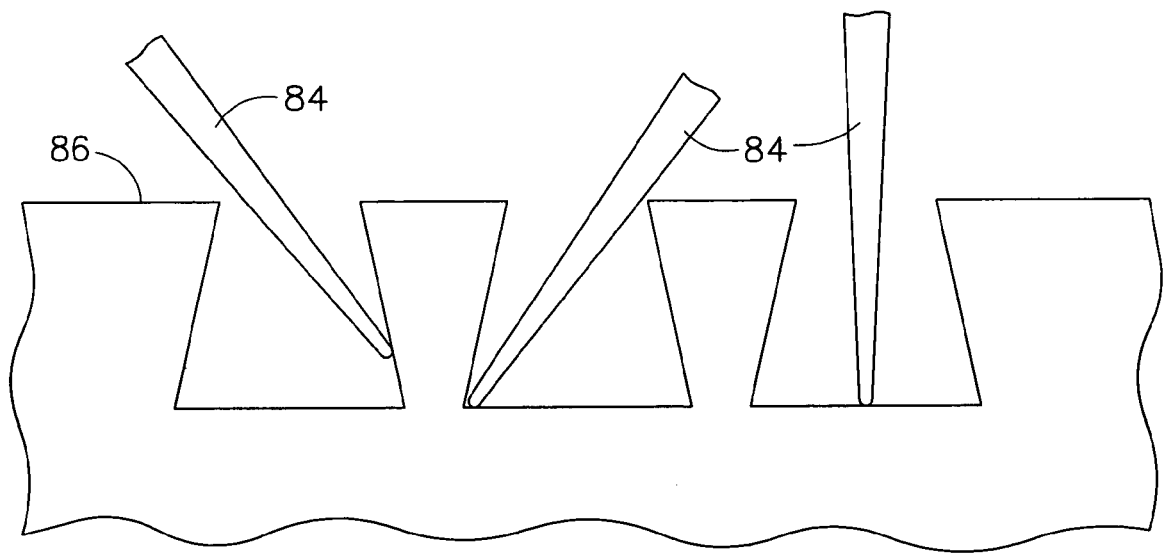
FIG. 7 shows a single tilted probe measuring the sidewall and bottom of a reentrant trench in several different configurations.
Figure 8:
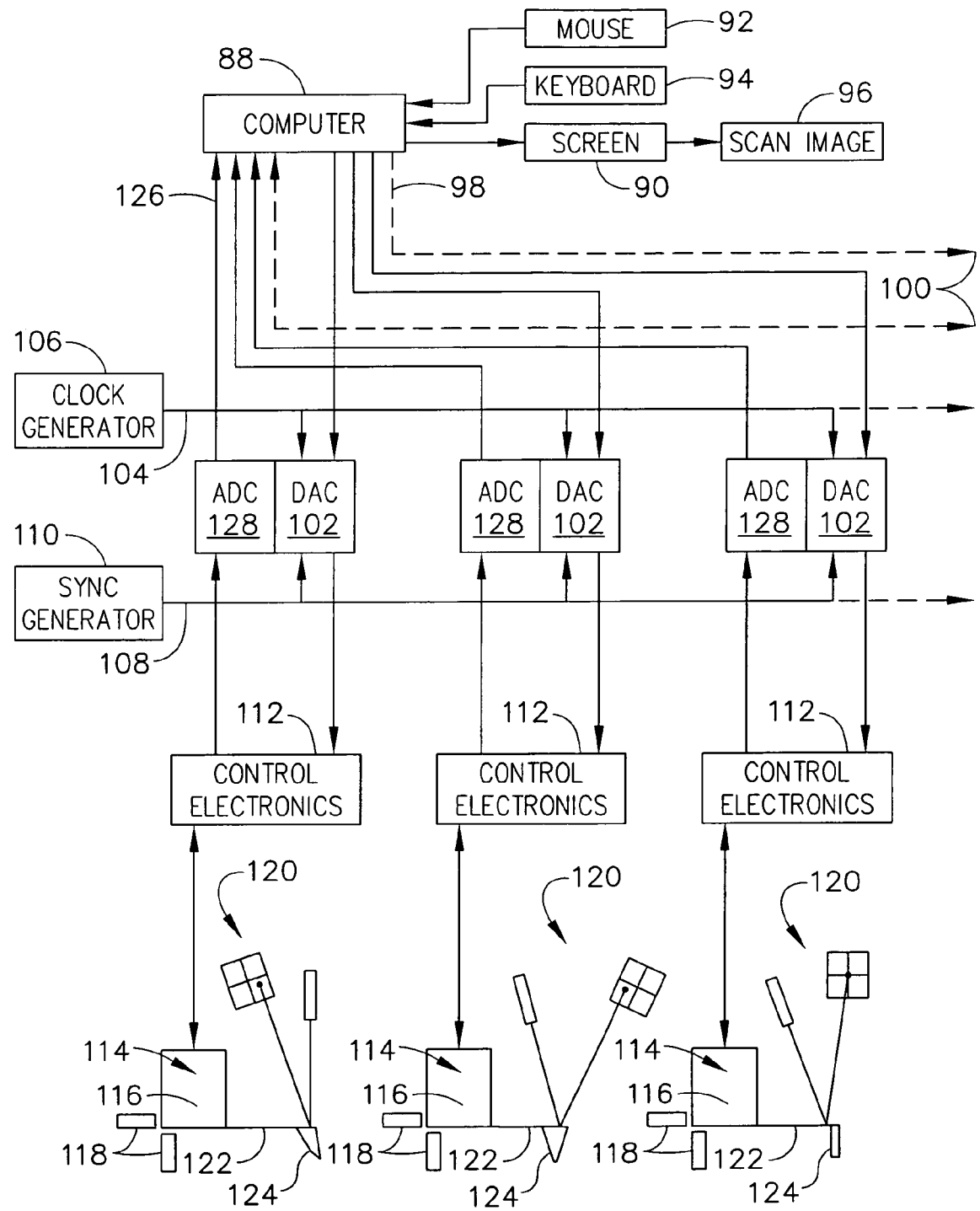
FIG. 8 is a block diagram of the hardware configuration of an embodiment of the invention.

FIG. 8 shows a schematic diagram of the elements of an SPM system in which the present invention may be embodied. The user accesses software for operation of the invention via a computer 88. The computer 88 is of a standard configuration, such that it is connected to a screen 90, a mouse 92, and a keyboard 94. A scan image 96 is displayed on the screen 90. The computer 88 generates scan waveforms 98. A generalized case for more than three probes is represented by additional waveforms 100. There is one complete, independent set of scan waveforms to control motion of a probe tip. The scan waveforms are output to digital to analog converters 102 (DACs). There is one DAC 102 for each probe tip control. The DACs 102 share a clock signal 104 provided by clock generator 106 that ensures the scan waveforms remain synchronized. The DACs 102 also share a synchronization pulse 108 provided by sync generator 110 that ensures that the scanning starts at the same time. The DACs 102 drive control electronics 112. Control electronics for SPM operation are well known to one skilled in the art. There is one complete, independent set of control electronics 112 for each probe. The control electronics are each connected to an AFM head 114. Each AFM head 114 contains a 3-axis actuator 116, a feedback position sensor 118 and a deflection sensor 120. The 3-axis actuator 116 provides for scanning along the sample. The feedback position sensor 118 in conjunction with the control electronics 112 provides calibrated scanning. For the embodiment shown, the deflection sensor 120 in conjunction with 1-axis of the 3-axis actuator 116 provides for constant force AFM scanning. This system may also be operated without force feedback, where the deflection sensor is used to generate the scan image. Alternative SPM techniques for scanning are employed in alternative embodiments as will be described subsequently. Attached to the AFM heads are the cantilever 122 and scanning probe tips 124. The control electronics 112 generate the image data 126. The image data 126 is passed to the analog to digital converters 128 (ADCs). The ADCs 128 convert the image data 126 to digital format pass the image to the computer 88. The computer 88 can then display the scan image 96 to the user on the computer screen 90.

Figure 9:
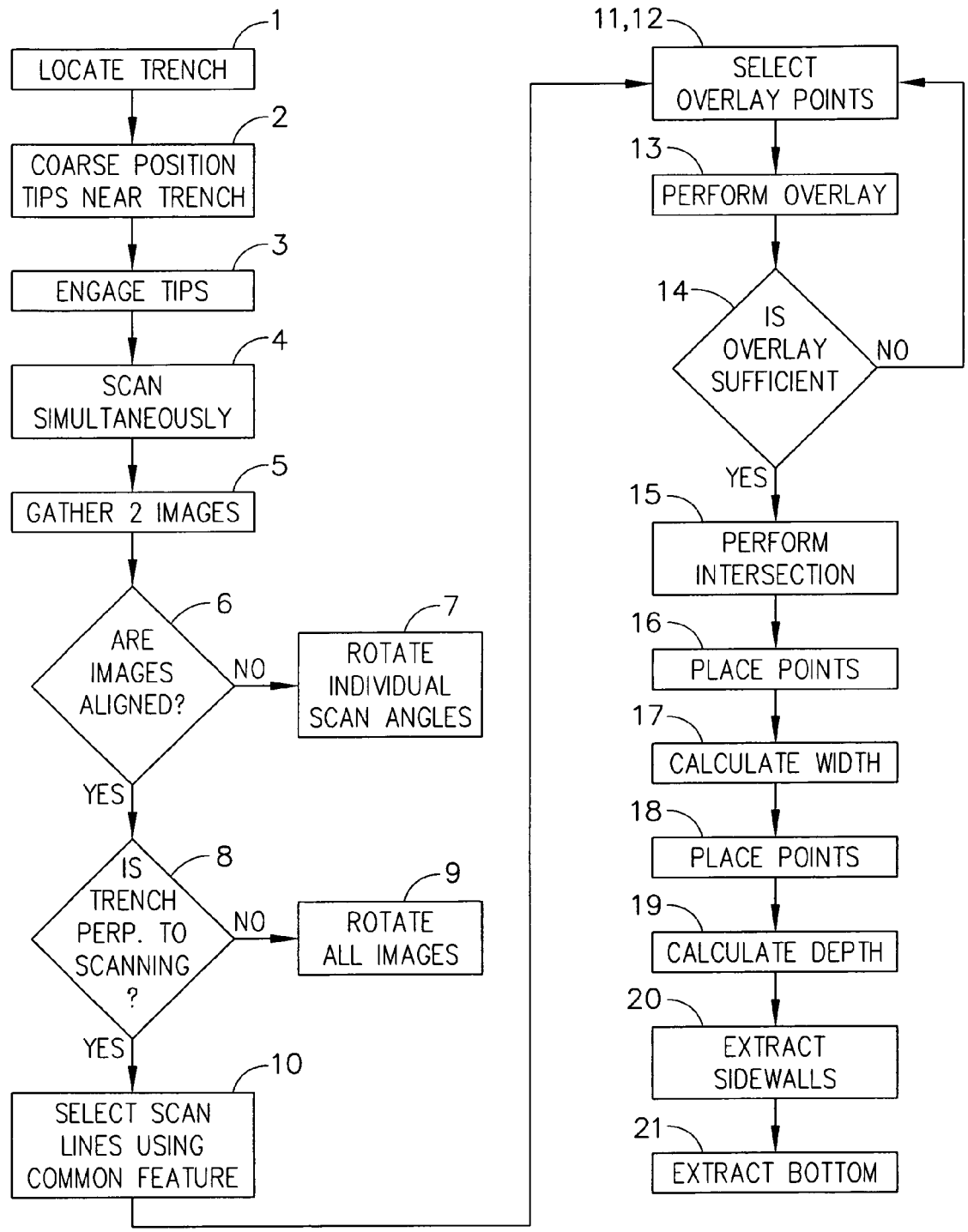
FIG. 9 is a flow chart of system operation.
Figure 10:
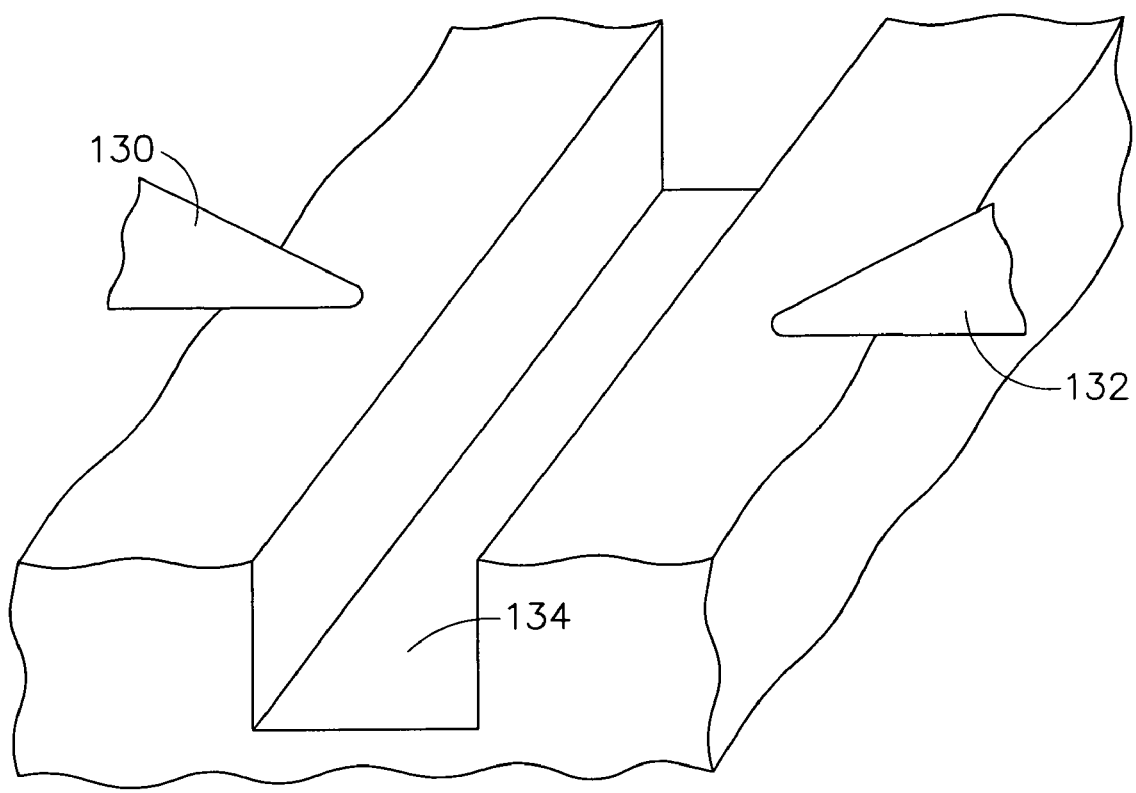
FIG. 10 shows an exemplary view of probe tips incorporated in an embodiment of the invention positioned over a trench as a feature of interest.

FIG. 9 shows a flowchart of the operation of an exemplary embodiment of a system employing the present invention. Representative views of the topography and elements of the invention are shown in FIGS. 10-15f for explanation with the flowchart. A first tip 130 and a second tip 132 each mounted on and controlled by separate AFMs are employed to locate the trench 134, step 1, and positioned near the trench that will be measured, step 2. The trench has vertical sidewalls in this example and the first tip and second tip are conical tips made from Tungsten. FIG. 10 shows a view of the tips over the trench. It is worth noting that for many trenches and tips of interest the view represented in FIG. 10 is too high of a magnification to be obtained by a conventional optical microscope using visible light. Returning to FIG. 9, the first tip 130 and the second tip 132 are then engaged on the sample, step 3, by their respective SPMs using a constant-deflection, force feedback that is well known to one skilled in the art of AFM.

Figure 11:
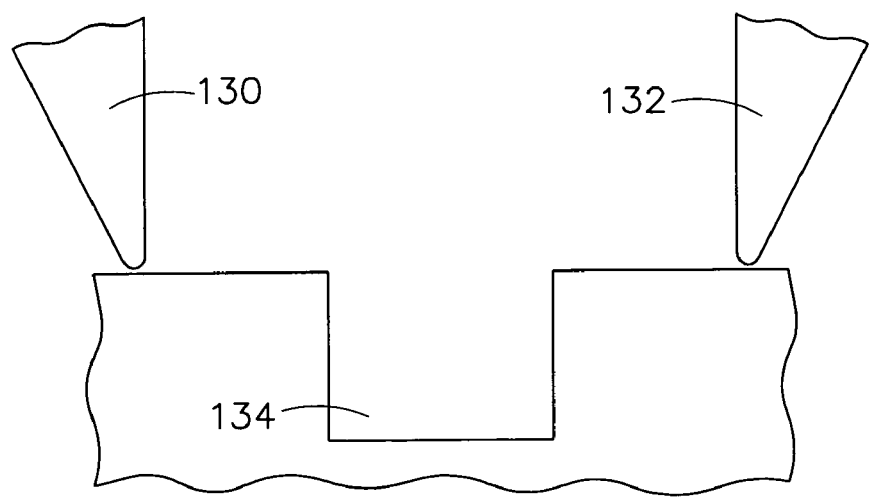
FIG. 11 shows the scanning operation of the tips of FIG. 10 with respect to the trench.
Figure 12A:
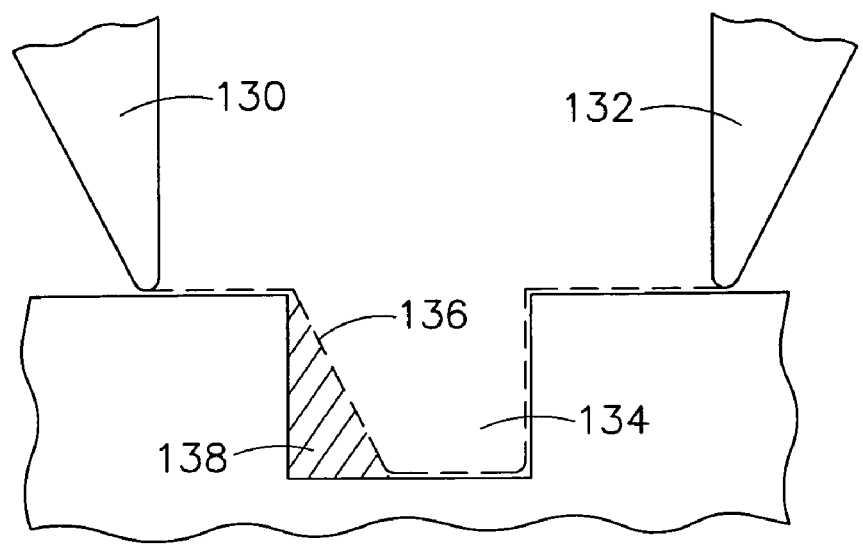
FIGS. 12a and 12b show the first and second tip, respectively, scanning the trench.
Figure 12B:
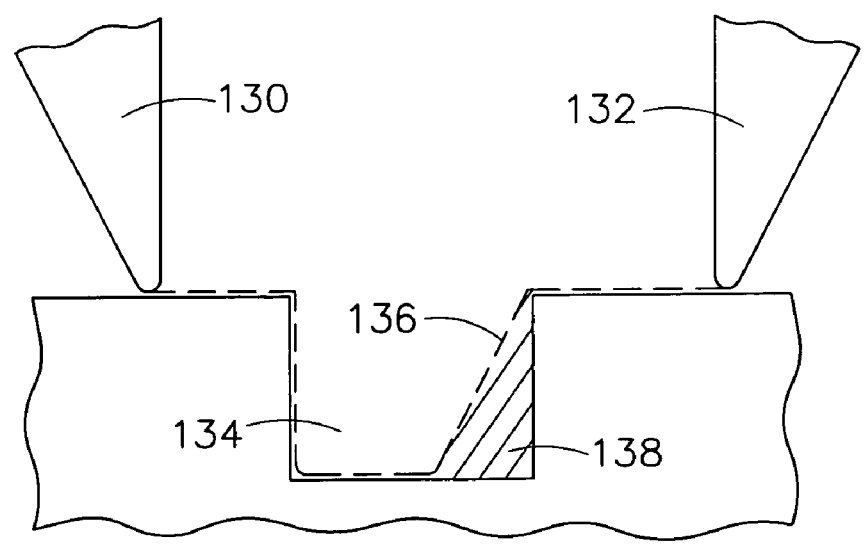

The first tip 130 and second tip 132 are then scanned substantially simultaneously over the trench 134, step 4, as disclosed in pending U.S. patent application Ser. No. 10/615,223 entitled SOFTWARE SYNCHRONIZATION OF MULTIPLE SCANNING PROBES having a common assignee with the present application, the disclosure of which is incorporated herein by reference as though fully set forth. FIG. 11 depicts the scanning operation of the first tip 130 and second tip 132 relative to the trench 134. While the first tip and second tip are scanning, they gather topography data. Additionally, the tips are biased with a voltage and they measure the current flow into or out of the sample. The topography data obtained by each tip will provide two images, step 5, that contain tip artifacts because of interactions between the tip and the trench 134. FIG. 12a shows the first tip 130 scanning over the trench 134, producing scan data 136 that contains tip artifacts 138. Similarly, FIG. 12b shows the second tip 132 scanning over the same trench 134, also producing scan data 136 that contains tip artifacts 138.

Figure 13A:
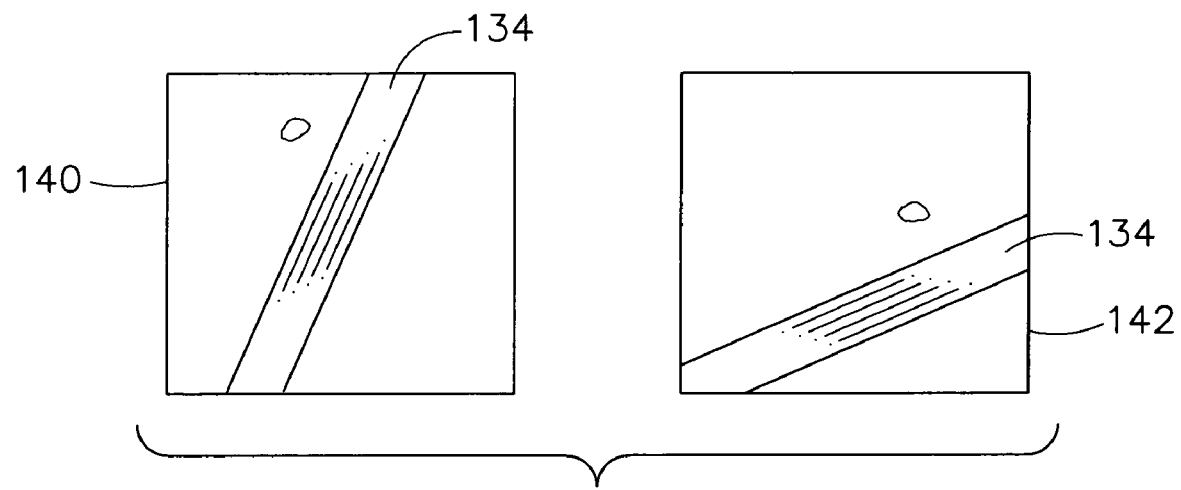
FIGS. 13a, 13b and 13c show the trench in various scan orientation angles.
Figure 13B:
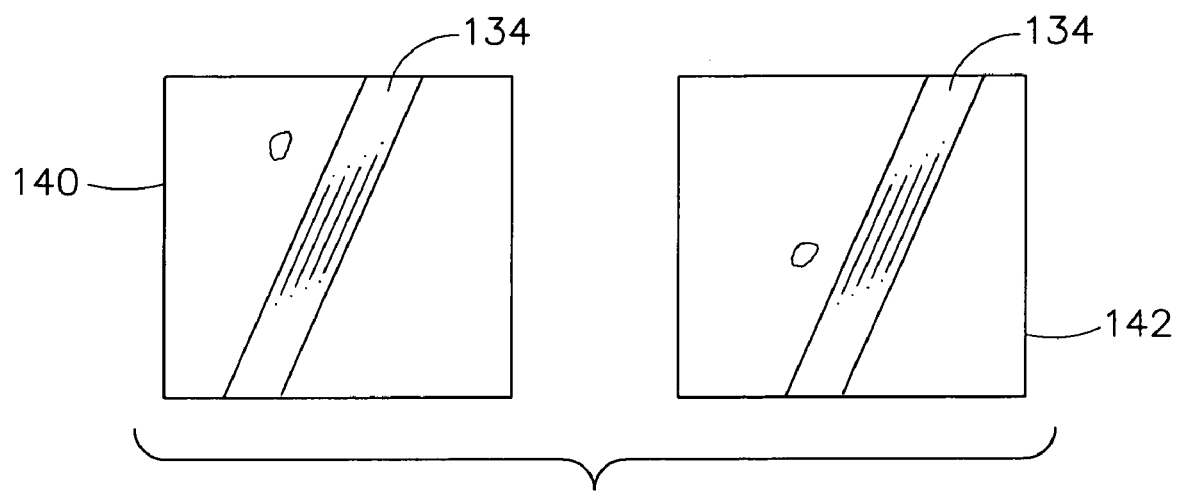
Figure 13C:
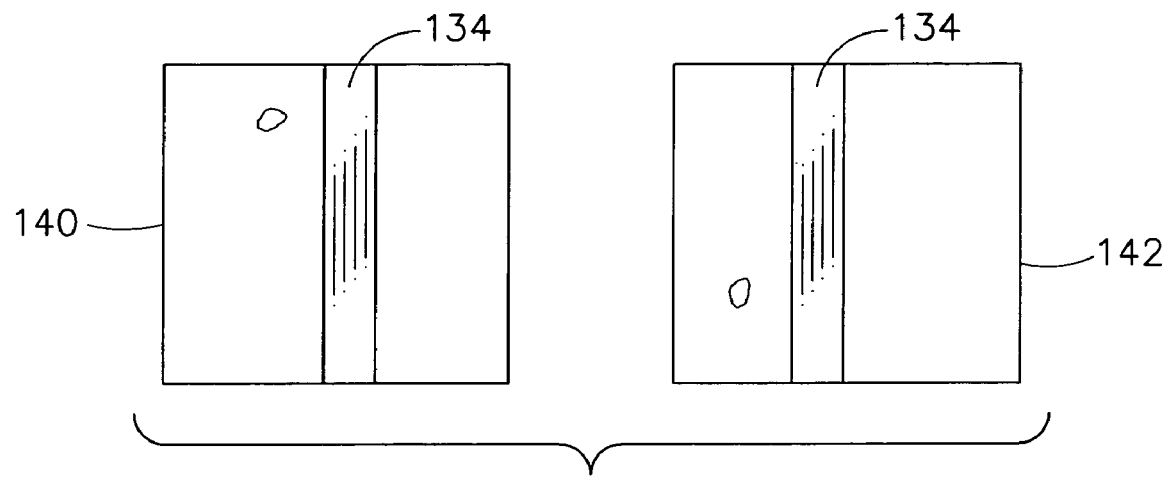
Figure 13D:
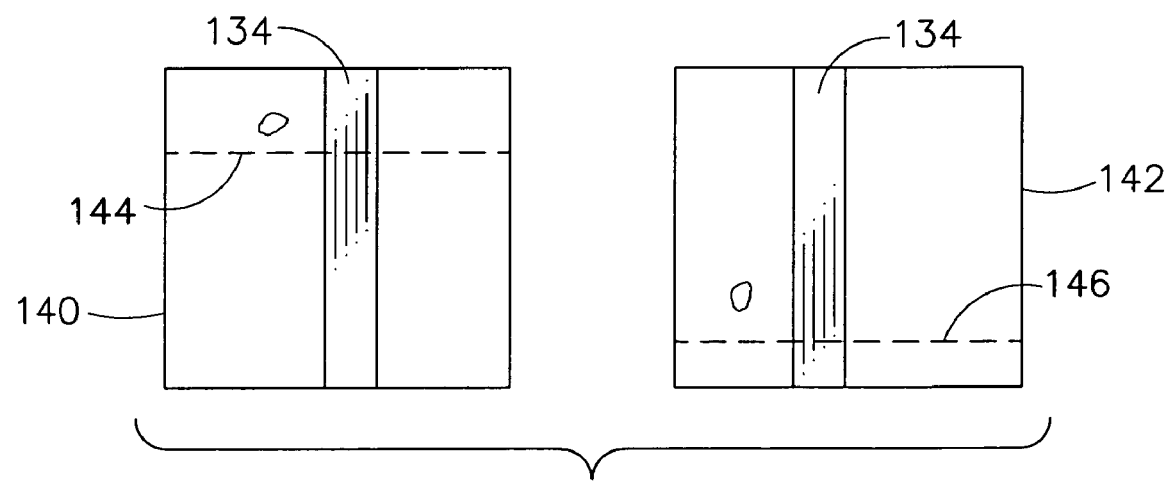
FIG. 13d shows the scan lines of the two probes after correction of the orientation angle for the scan.

FIG. 13a shows a first topography image 140 gathered by the SPM connected to the first tip 130 and a second topography image 142 gathered by the SPM connected to the second tip 132. The images are checked for alignment, step 6. For exemplary purposes the drawings initially do not show the trench 134 in the same orientation, as seen in FIG. 13a. The scan angle of the second SPM is rotated, step 7, so the trench 134 has the same orientation in the first topography image and in the second topography image, as shown in FIG. 13b. Because the width of the trench will appear artificially large if the first tip and second tip do not scan across the trench in a perpendicular direction, a determination is made if the trench is perpendicular to the scan, step 8, and the scan angle of the SPM connected to the first tip and the scan angle of the SPM connected to the second tip are then rotated together, step 9, so the tips scan perpendicular across the trench, as shown in FIG. 13c. A first scan line 144 and a second scan line 146 are extracted from the image data, step 10 of FIG. 9, as represented in FIG. 13d. The scan lines are determined to be in the same location by using a common feature 148 in the first topography image 140 and the same common feature 148 in the second topography image 142.

Figure 14A:
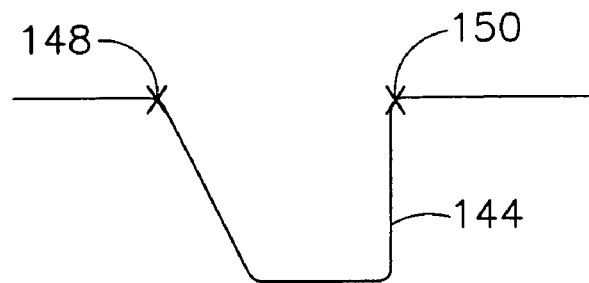
FIGS. 14a and 14b show a first and second scan line of the trench.
Figure 14B:
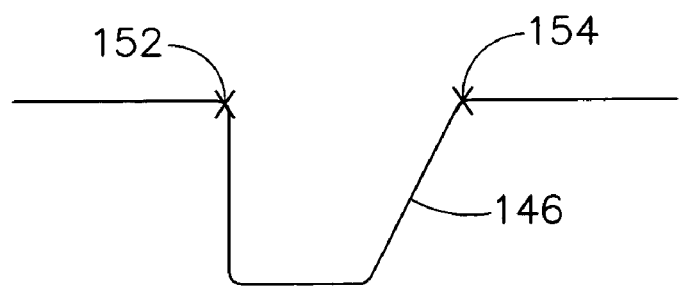

FIG. 14a shows a first scan line 144 of the trench and FIG. 14b shows a second scan line 146 of the trench, as displayed by the system. In FIG. 14a, a first point 148 on the first scan line 144 is selected that is at the top left corner of the trench in the scan line for this example and a second point 150 on the first scan line 148 is selected that is at the top right corner of the trench in the scan line, step 11. Additionally, as represented in FIG. 14b a first point 152 on the second scan line 146 which is at the top left corner of the trench in the scan line and a second point 154 on the second scan line 146 that is at the top right corner of the trench in the scan line are selected, also as a portion of step 12.

Figure 14C:
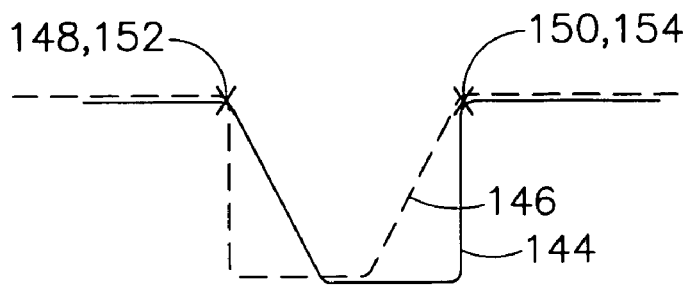
FIG. 14c shows the resulting display from overlaying the first and second scan lines.

By placing the first point 148 on the first scan line 144 and the first point 152 on the second scan line 146 at the same location, and by placing the second point 150 on the first scan line 144 and the second point 154 on the second scan line 146 at the same location the scan lines are overlaid and displayed on the same graph, step 13. FIG. 14c provides a visual representation of the resulting display. If the overlay is not sufficiently accurate, step 14, the selection of a first point and a second point on both scan lines is repeated by returning to step 11 until the overlay is accurate.

Figure 15A:
FIG. 15a shows a representation of the combined scan lines.

Now that the scan lines have been overlaid, the scan lines are combined into one data set. To work with data that represents the trench and removes the data that contains the tip artifacts, the logical operation of intersection, step 15, is performed on the two sets of data. FIG. 15a shows the resulting combined scan line 156 of the first scan line 144 and second scan line 146. The intersection operation results in a combined scan line that shows material as being part of the trench only if it was present in both the first scan line and the second scan line. Note that the tip artifacts have been removed. The removal of the tip artifacts is enabled by the use of tips with appropriate geometries to account for the artifacts of the other probes and the logical intersection operator. Next, measurements of interest are extracted from the scan data. The combined scan line 156 of the trench is used to extract measurements such as width, depth, surface roughness at the bottom of the trench and sidewall profiles of both sidewalls.

Figure 15B:
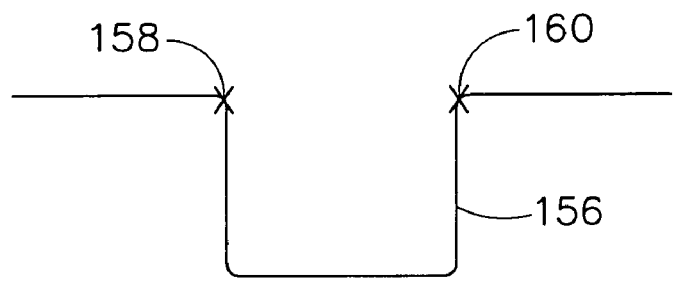
FIGS. 15b, 15c, 15d, 15e and 15f show selection points and surfaces for measurement of the top and bottom widths, depth sidewalls, top and bottom of the trench.
Figure 15C:
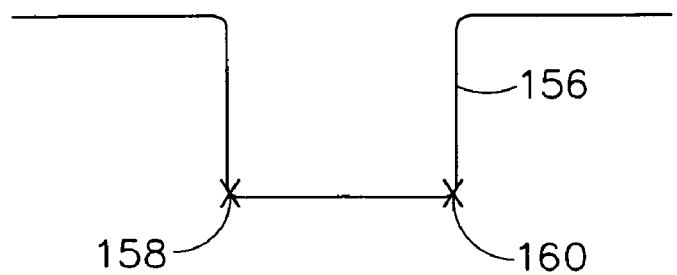
Figure 15D:
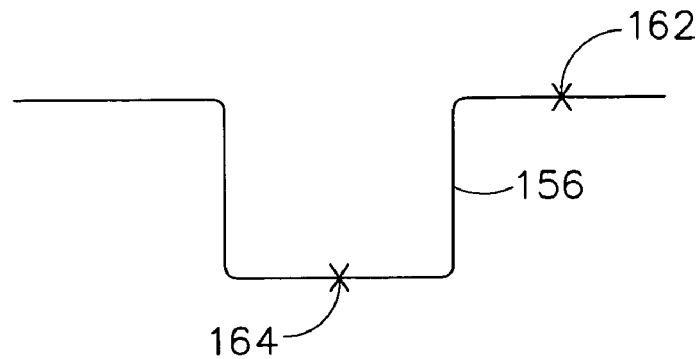
Figure 15E:
Figure 15F:
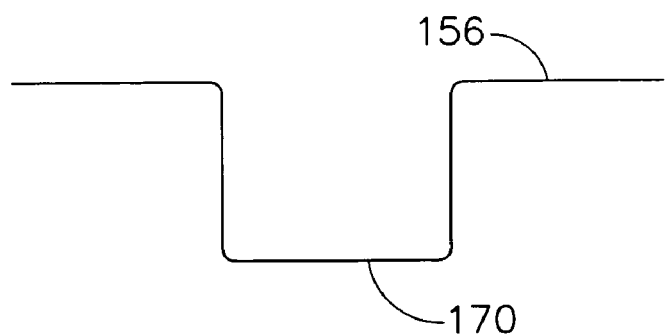

A first point 158 on the left sidewall and a second point 160 on the right sidewall are placed as indices of the combined scan line 156 of the trench, step 16. By subtracting the lateral positions of the two points, a determination of the width of the trench is made, step 17. FIG. 15b shows the points selected at the top of the sidewall, to measure the width of the top of the trench. FIG. 15c shows the points at the bottom of the sidewalls, to measure the width at the bottom of the trench. Similarly, a first point 162 at the top of the trench and a second point 164 at the bottom of the trench are placed as a second set of indices of the combined scan line 156, step 18. By subtracting the vertical position of the two points, the depth of the trench is determined, step 19. Using the resulting data corrected for the tip artifacts, the shape of the sidewalls is extracted, step 20, and the bottom profile is also extracted, step 21. FIG. 15e shows a representation of the left sidewall 166 and the right sidewall 168 of the combined scan line 156, which can be used to characterize the manufacturing process of the trench. FIG. 15f shows the bottom 170 of the combined data line 156, which can be used to characterize trench manufacturing processes and to calculate the surface roughness of the bottom of the trench.

Figure 16:
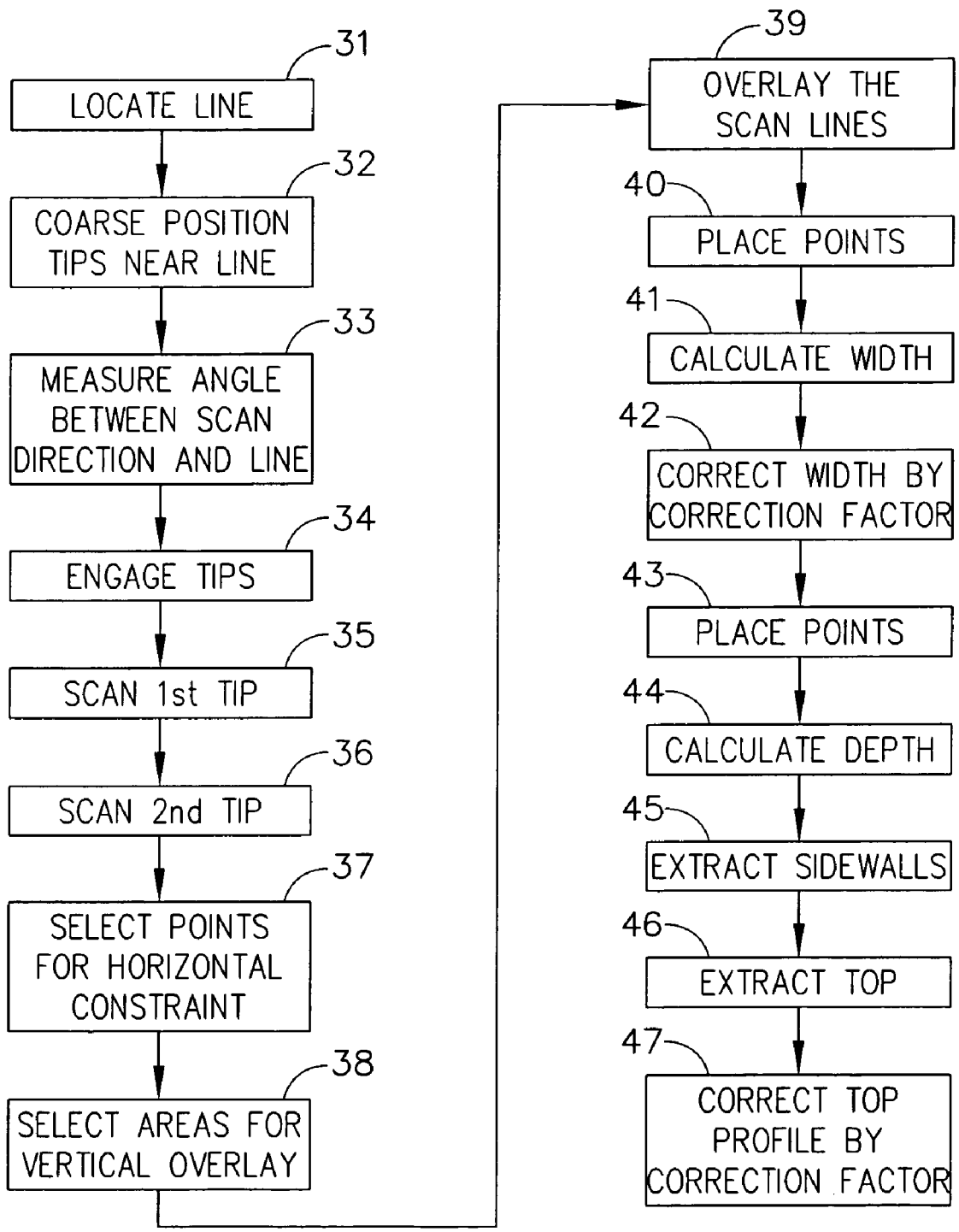
FIG. 16 is a flow chart of the operation of an additional embodiment of the invention.
Figure 17:
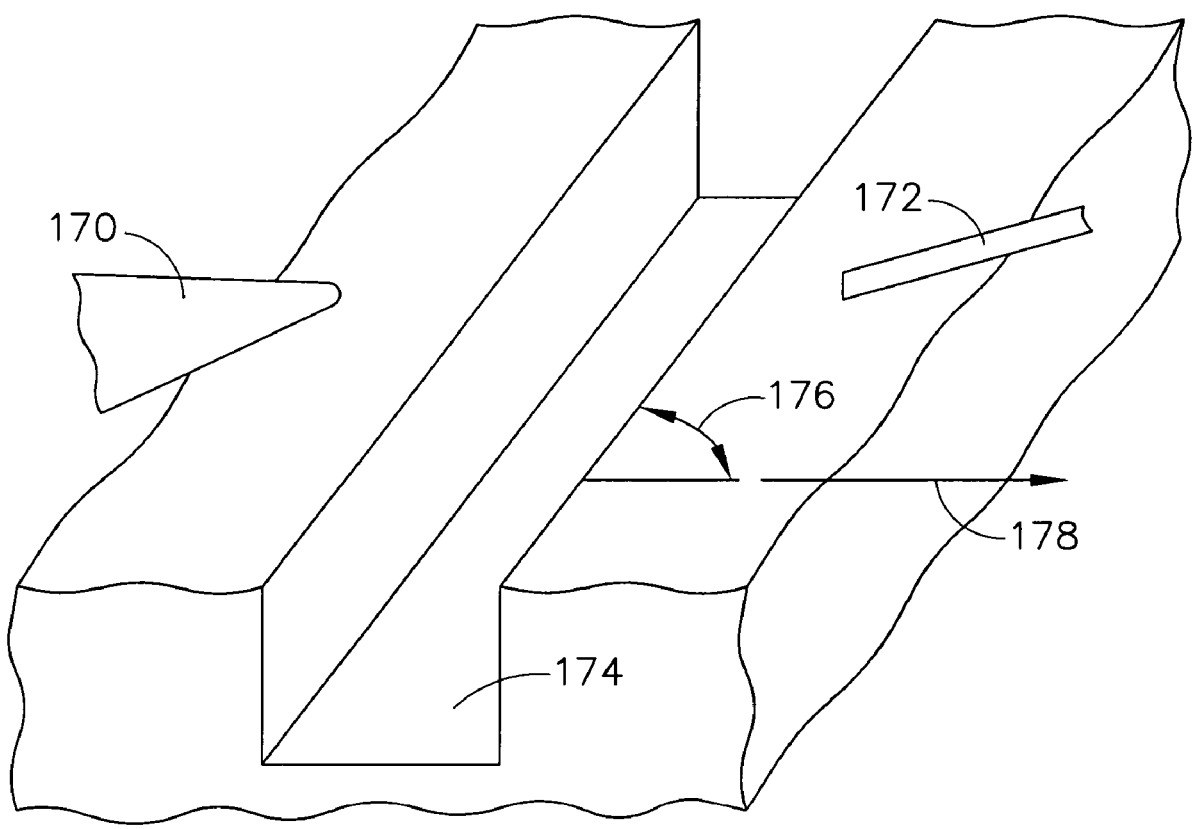
FIG. 17 depicts two probes coarsely positioned near a line as a feature of interest.

FIG. 16 shows a flowchart of the operation of an additional embodiment. Representative views of the topography and elements of the invention are shown in FIGS. 17a-21d for explanation with the flowchart. A line location is determined, step 31, and a first tip 170 and a second tip 172 are positioned near a line 174 that will be measured by multiple SPMs, step 32. For the example discussed, the line 174 has near vertical sidewalls and the first tip 170 is a large, conical silicon tip coated with Nickel, while the second tip 172 is a carbon nanotube. FIG. 17 shows a representation of the tips coarsely positioned near the line 174. For the example discussed, the first tip is engaged on the surface without force feedback, but measuring deflection and the second tip is engaged using constant-deflection, force feedback. The angle 176 between the line 174 and the scanning direction 178 is measured, step 33. The correction factor to correct for distortion caused by the scan direction not being perpendicular to the line 174, is equal to SINE(angle). The first tip and the second tip are engaged on the surface, step 34 of FIG. 16.

Figure 18A:
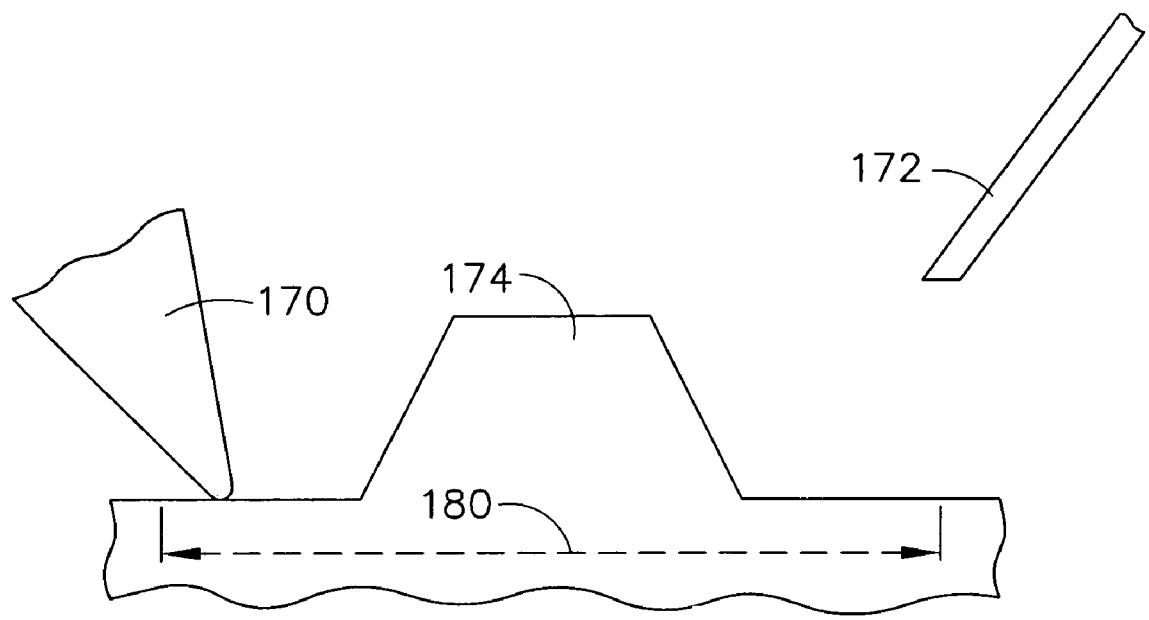
FIGS. 18a and 18b depict scanning of the line with two selected scan sizes.
Figure 18B:
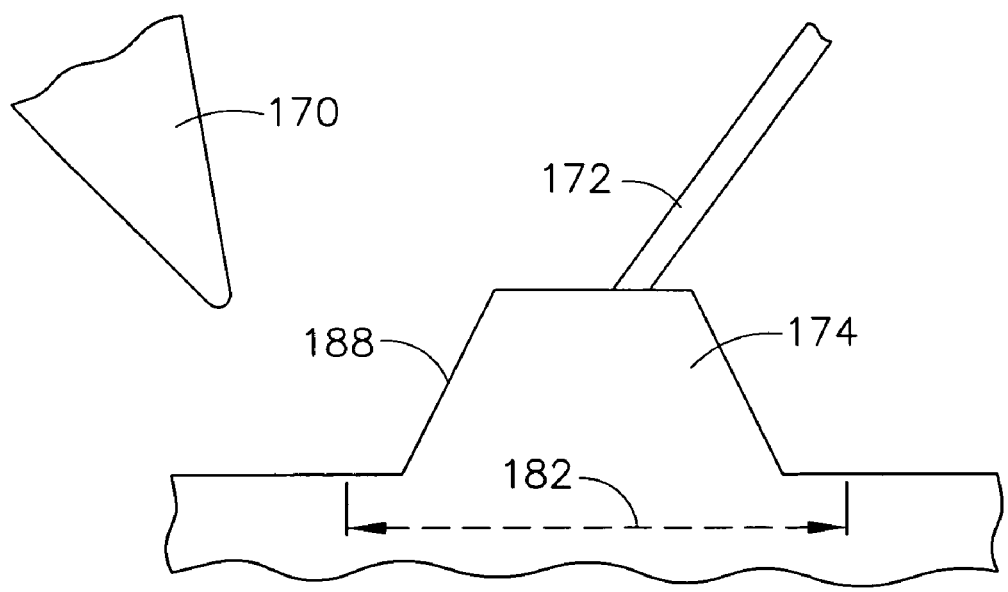
Figure 19A:
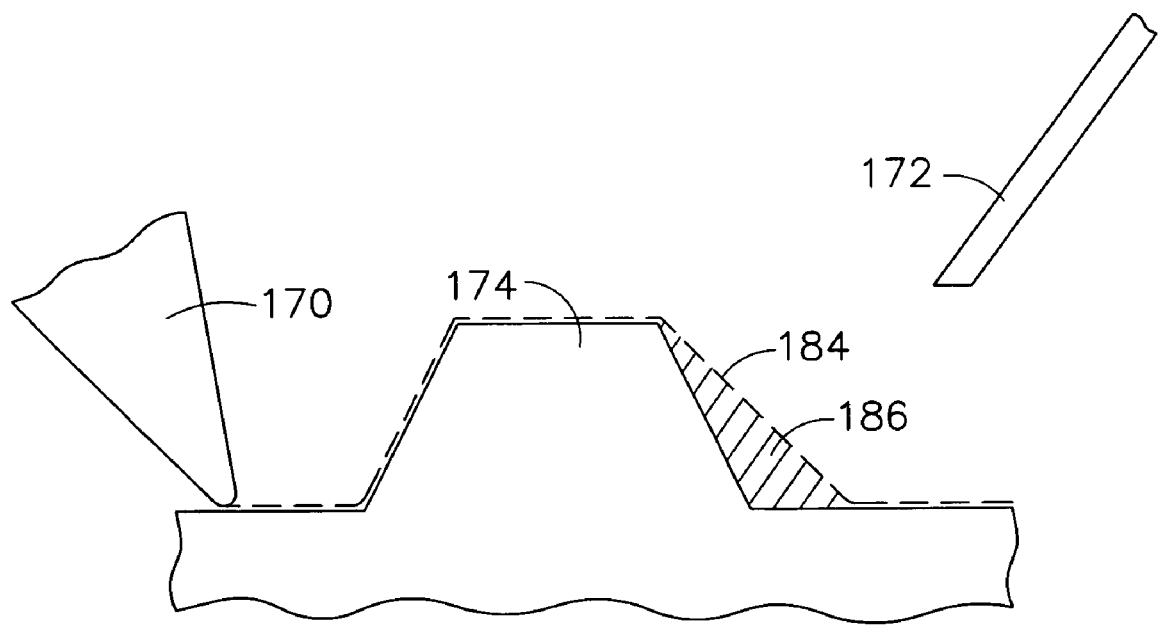
FIGS. 19a and 19b show the first and second tip, respectively, scanning the line.
Figure 19B:
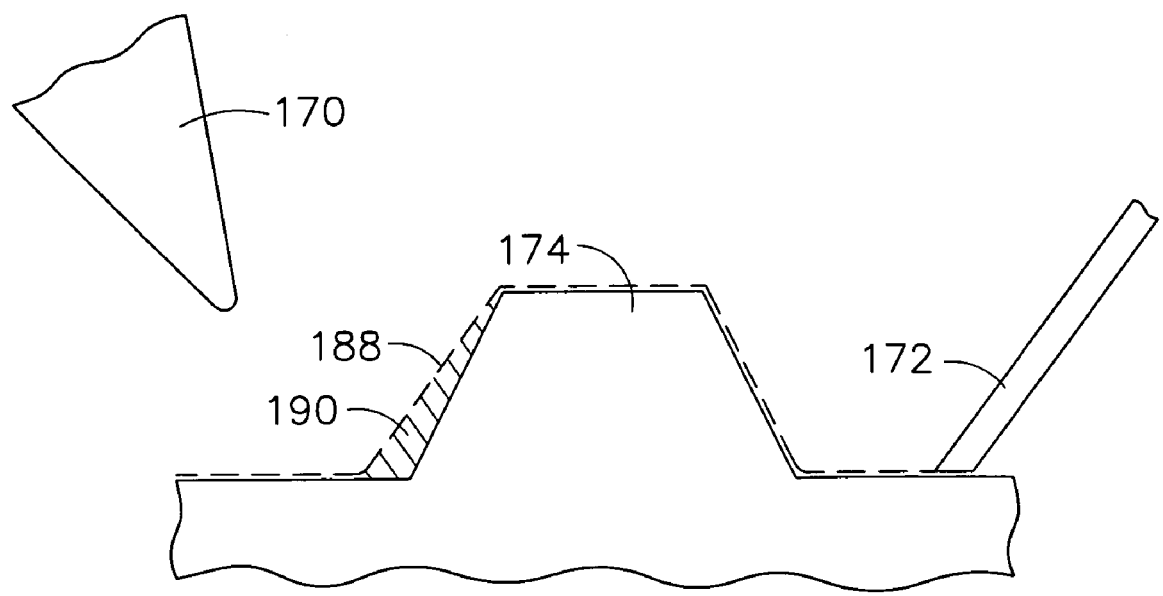

FIG. 18a shows a representation of the first tip 170 scanning the line 174 with a first scan size 180, step 35, of FIG. 16. Then, based on the data taken by the scanning of the first tip, the second tip 172 will take a smaller second scan size 182 of the line 174, step 36, as shown in FIG. 18b. While the first tip and the second tip are scanning, they gather topography data. Additionally the SPM attached to the first tip is equipped with a high-resolution capacitance sensor, and the first tip gathers scanning capacitance data as it scans. The SPM attached to the second tip gathers no additional signals beyond topography. The topography data obtained by each tip will contain tip artifacts because of interactions between the tip and the line. FIG. 19a shows the first tip 170 scanning over the line 174, producing scan data 184 that contains tip artifacts 186. Similarly, FIG. 19b shows the second tip 172 scanning over the same line 174, also producing scan data 188 that contains tip artifacts 190.

Figure 20A:
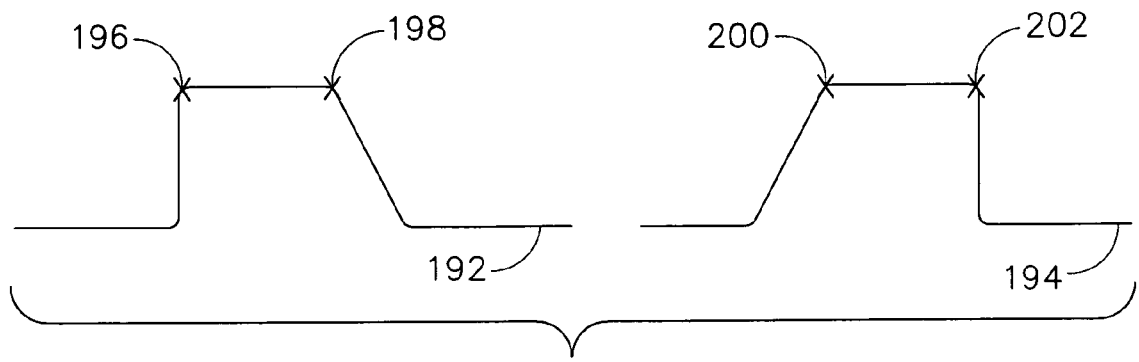
FIG. 20a shows a first scan line and a second scan line for point selection.
Figure 20B:
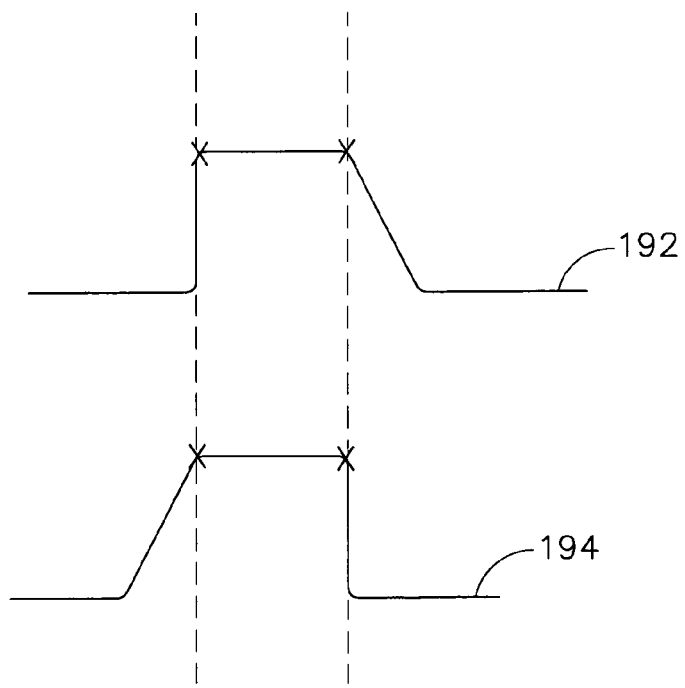
FIG. 20b shows the first line scan and the second line scan aligned in the horizontal axis.
Figure 20C:
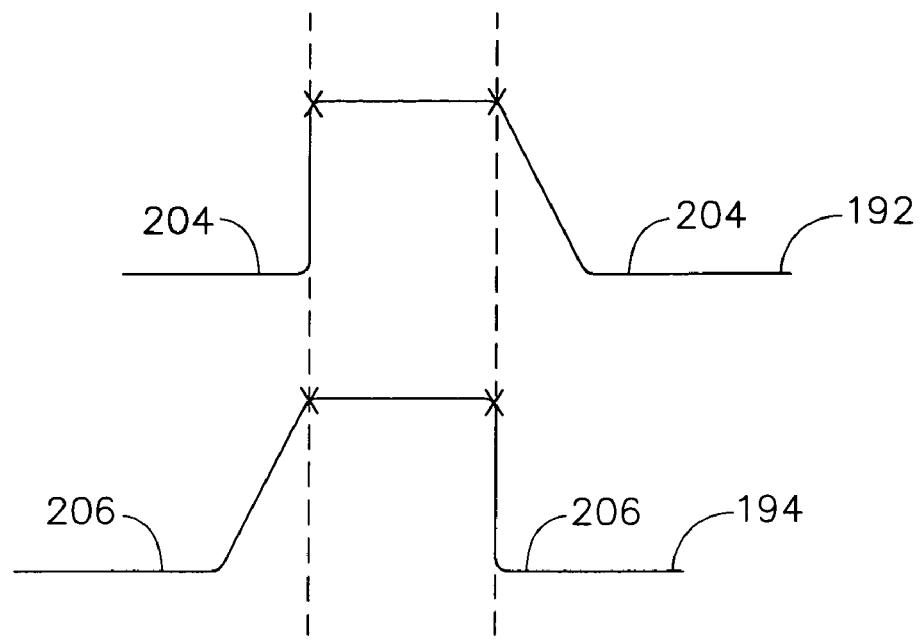
FIG. 20c demonstrates selection for a vertical overlay.
Figure 20D:
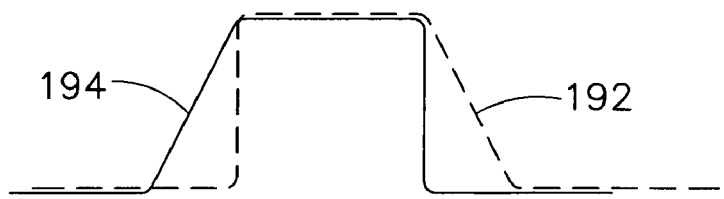
FIG. 20d shows the first line scan and the second line scan after the overlay.

FIG. 20a shows a first scan line 192 generated from the scan data from the first tip and a second scan line 194 generated from the scan data from the second tip. In order to create one overlay image, a first point 196 and a second point 198 on the first scan line 192 are selected and a first point 200 and a second point 202 on the second scan line 194 are selected which will constrain the first scan line 192 to the second scan line 194 in the horizontal axis, step 37 in FIG. 16. These points are used to align the scan lines horizontally by defining both the first point 196 on the first scan line 192 and the first point 200 on the second scan line 194 to have the same horizontal position and defining the second point 198 on the first scan line 192 and the second point 202 on the second scan line 194 to also have the same horizontal position. FIG. 20b shows the first scan line 192 and the second scan line 194 aligned in the horizontal axis. The flat area 204 on the first scan line 192 and the flat area 206 on the second scan line 194, which do not contain the line 174 in either scan lines are selected for a vertical overlay, step 38, as represented in FIG. 20c. The first scan line 192 and the second scan line 194 are overlaid by minimizing the subtracted area of the flat areas 204 and 206, step 39. FIG. 20d shows the first line scan 192 and the second line scan 194 after they have been overlaid.

Figure 20E:
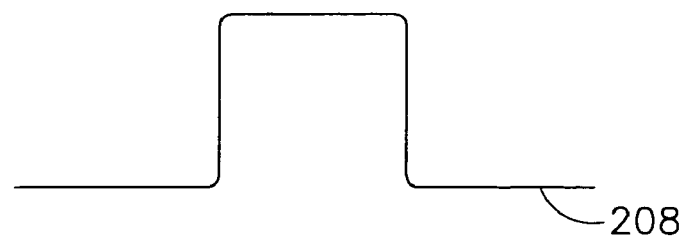
FIG. 20e shows the intersection of a combined scan line.

Although not part of this particular embodiment, if the scan lines are to be combined into a combined scan line 208 using the intersection operator, as in the previous embodiment, the results for this embodiment are shown in FIG. 20e.

Figure 21A:
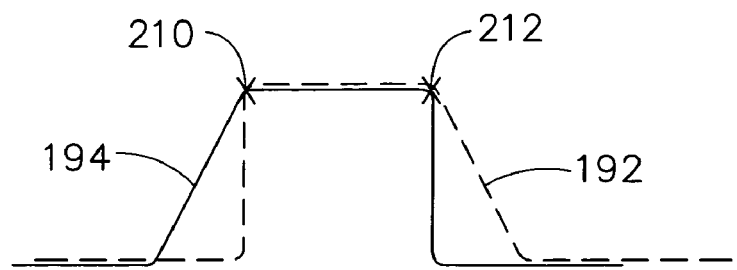
FIGS. 21a and 21b show point selection for line width determination.
Figure 21B:
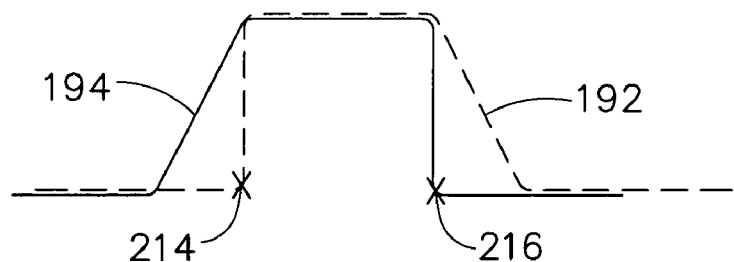
Figure 21C:
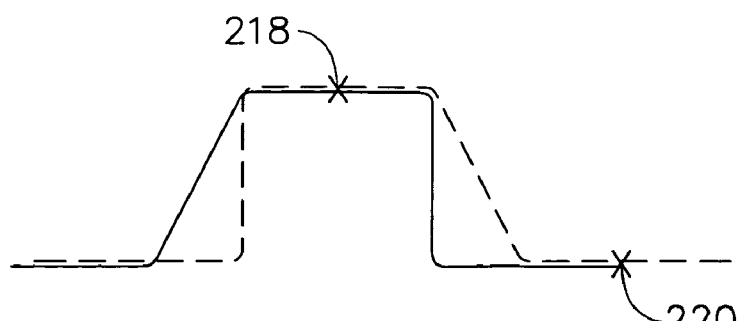
FIGS. 21c and 21d demonstrate point selection for line height and sidewall profile determination.
Figure 21D:
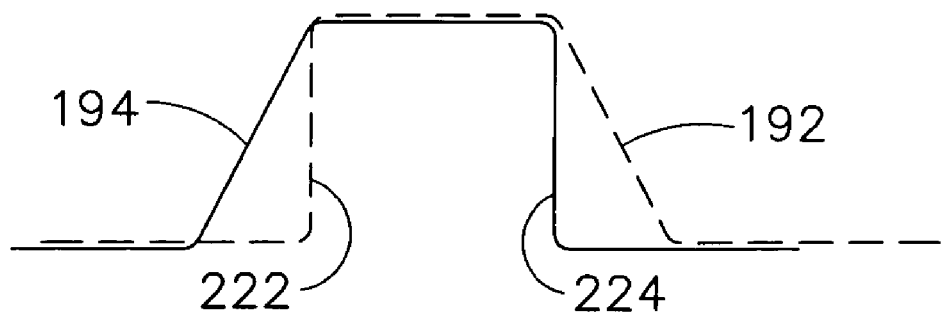
Figure 21E:
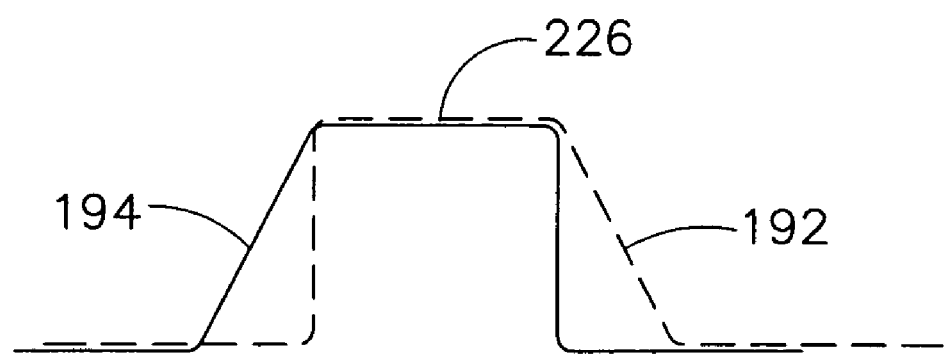
FIG. 21e shows selections for top profile determination.

A first point 210 on the top left corner of the first scan line 192 and a second point 212 on the top right corner of the second scan line 194 are placed, step 40, as shown in FIG. 21a. By subtracting the lateral positions of the two points, a determination of the width of the top of the line 174 is made, step 41. However, this width is distorted and multiplying by the correction factor previously defined, which is equal to SINE(angle 176), gives the actual width, step 42. A first point 214 on the bottom left corner of the first scan line 192 and a second point 216 on the bottom right corner of the second scan line 194 are selected, as shown in FIG. 21b. By subtracting the lateral positions of these two points, a determination of the width of the bottom of the line 174 is made. The width correction as defined above is applied to this data. Next a first point 218 on the top of the line and a second point 220 off of the line are selected, step 43, as shown in FIG. 21c. By subtracting the vertical positions of these two points, a determination of the height of the line is made, step 44. By selecting the left sidewall profile 222 of the first scan line 192 and the right sidewall profile 224 of the second scan line 194, step 45, as shown in FIG. 21d, the sidewall profiles are extracted. By selecting either the top profile 226 of the first scan line 192 or of the second scan line 194 the top profile of the line is extracted, step 46, as shown in FIG. 21e. The length of the top profile 226 is artificially long. The length of the top profile is multiplied by the correction factor from the width calculation to get the appropriate length, step 47.

Figure 22:
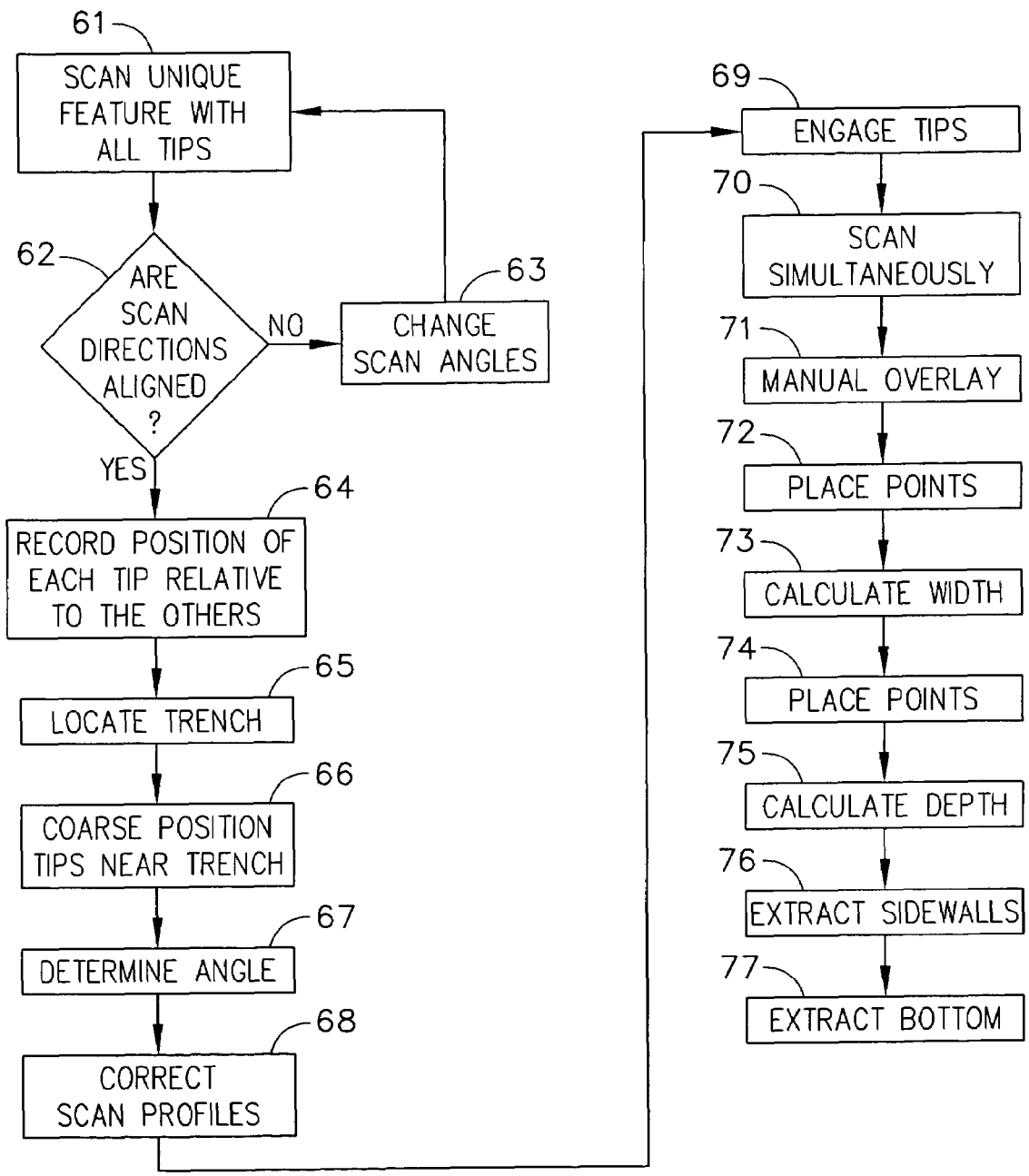
FIG. 22 is a flowchart of operation of a third embodiment of the invention.

FIG. 22 shows a flowchart of the operation of a third embodiment employing multiple tips mounted on SPMs. Representative views of the topography and elements of the invention are shown in FIGS. 23a-26e for explanation with the flowchart. Prior to locating the trench 228 that will be measured the tips are all scanned over a known unique feature, step 61. If during this scan the scan profiles for the SPMs are not such that the scan directions are aligned, step 62, then the scan angle 230 is changed so that all the probes scan in the same scan direction 232, step 63. Additionally, the known unique feature is used to record the positions of each tip relative to the others, step 64.

Figure 23A:
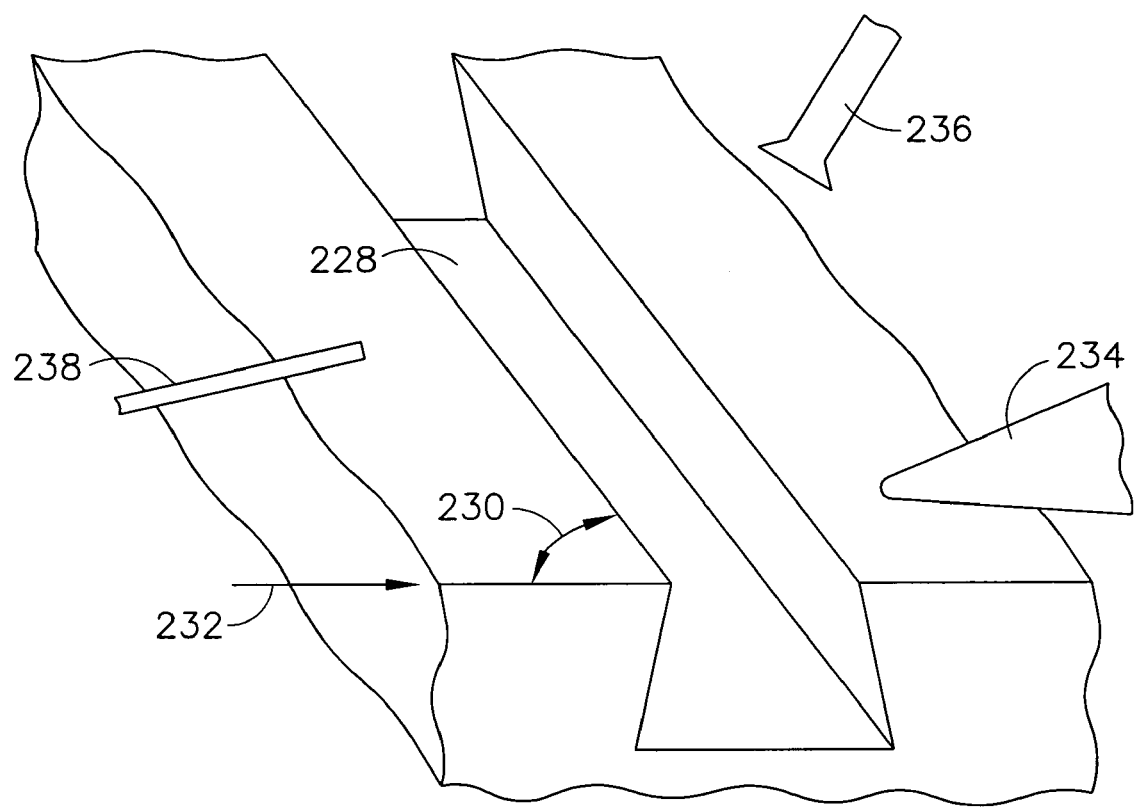
FIGS. 23a and 23b show a view of the tips over a trench as a selected feature.
Figure 23B:
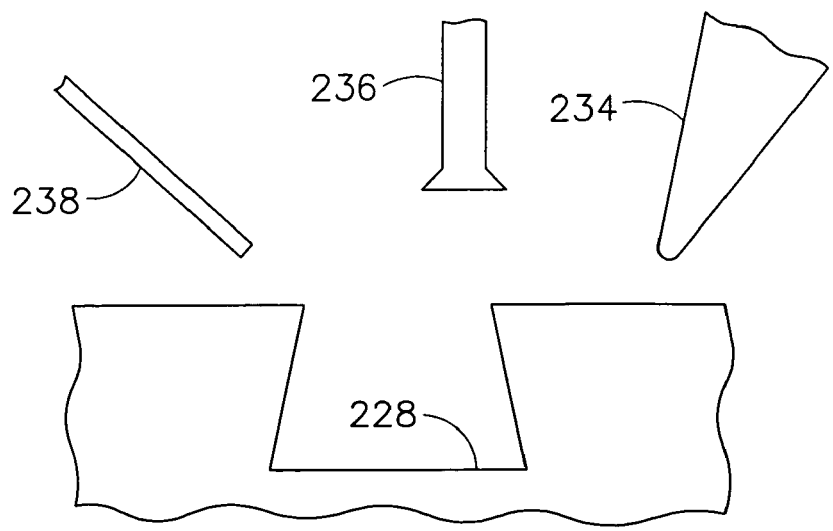

A trench 228 for which measurement is desired is located, step 65 and a first tip 234, a second tip 236 and a third tip 238 are positioned near the trench that will be measured, step 66. For the example described, the trench has reentrant sidewalls, the first tip 234 is a conical tip made of tungsten rhenium, the second tip 236 is a boot tip made of silicon and the third tip 238 is a silicon tip that has been processed in a focused ion beam to have a very sharp spike. FIGS. 23a and 23b show a view of the tips over the trench. The views of FIGS. 23a and 23b are monitored with a camera. Pattern recognition is used to determine the angle 230 of the trench 228 relative to the scan direction 232 of the tips, step 67. The SPM scan profiles are then corrected for all of the scan directions to make the SPMs scan perpendicularly over the trench, step 68.

The first tip 234 is cantilever mounted and is oscillated at the cantilever's first resonance frequency and engaged using constant-amplitude force feedback. The second tip 236 is also cantilever mounted and oscillated at its cantilever's torsional resonance, and engaged using constant-amplitude force feedback. The third tip 238 is also cantilever mounted and oscillated at its cantilever's second resonance and engaged using constant-frequency force feedback. All tips engage, step 69, and scan simultaneously over the trench using, step 70. As an example, scanning profiles as developed according to the previously referenced patent application Ser. No. 10/615223.

In this embodiment, the third tip 238 also interleaves scans in the air above the sample to conduct magnetic force microscopy (MFM). The SPM attached to the third tip gathers MFM data in addition to topography data. The SPM attached to the first tip 234 and the SPM attached to the second tip 236 only gather topography data.

Figure 24:
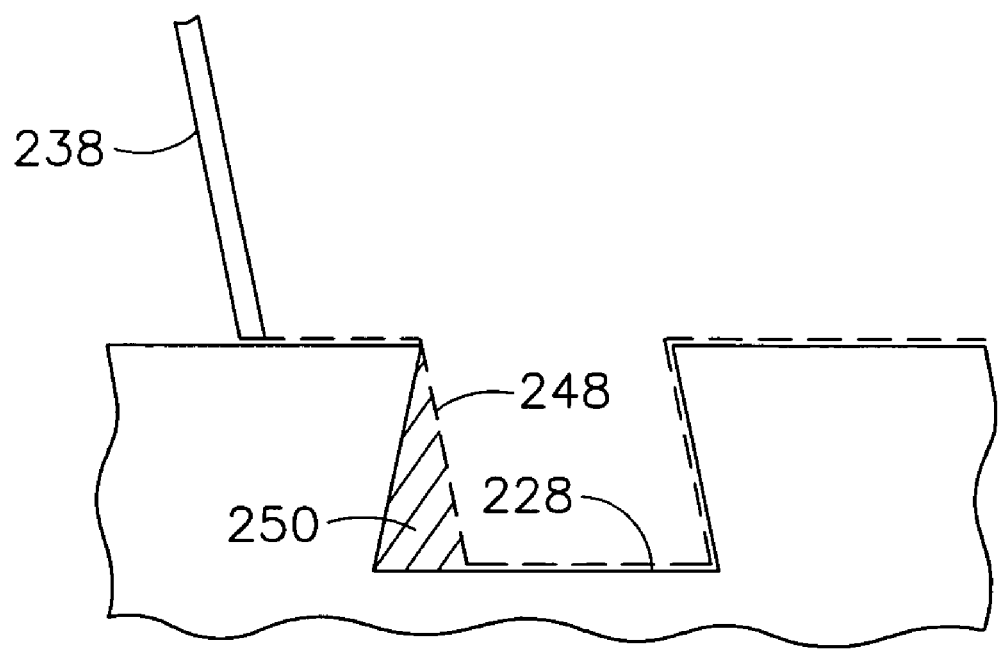
FIG. 24 shows the first of the three tips scanning the feature.

The tips are scanned simultaneously over the area of interest of the trench 228, step 70. The tips scan a single line. No image is collected in this embodiment. The topography data obtained by each tip contains tip artifacts because of interactions between the tip and the trench. FIG. 24 shows an exemplary tip 238 scanning over the trench 228, producing scan data 248 that contains tip artifacts 250.

Figure 25:
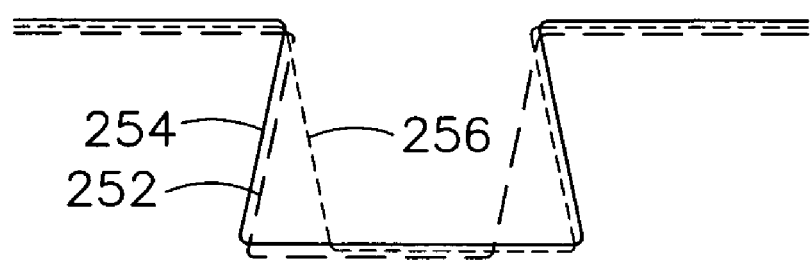
FIG. 25 show overlaid scan lines from the tips of FIGS. 24a, 24b and 24c.

The first scan line 252, the second scan line 254 and the third scan line 256 are placed on top of one another to create an overlay, step 71. Any of the scan lines are manipulated as necessary until a satisfactory overlay is obtained. The overlay is determined to be satisfactory when the subtracted area of the portions of the scan lines that do not contain tip artifacts have been minimized. FIG. 25 shows the scan lines after being overlaid.

Figure 26A:
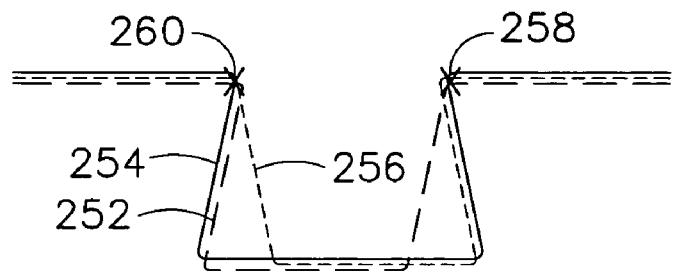
FIGS. 26a-26c show point selection and scan overlay for extraction of feature data from the scans.
Figure 26B:
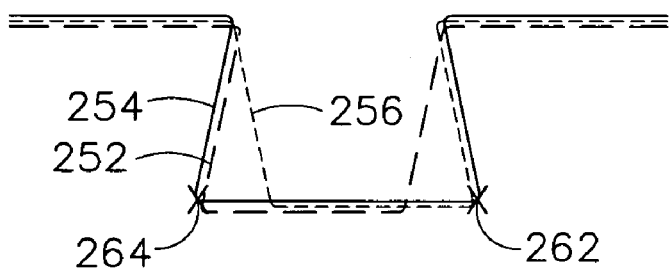
Figure 26C:
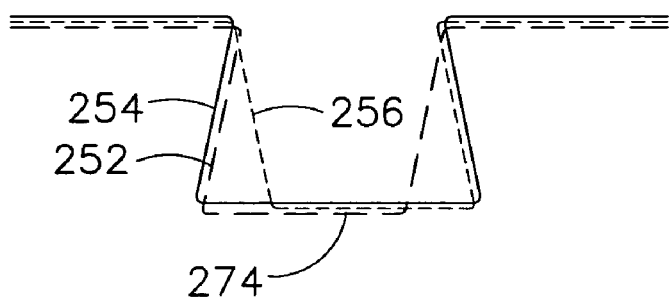

A first point 258 is placed on the top right corner of the first scan line 252 and a second point 260 is placed on the top left corner of the third scan line 260, step 72, as shown in FIG. 26a. By subtracting the lateral positions of the two points, a determination of the width of the top of the trench 228 is made, step 73. If desired, a first point 262 is then placed on the bottom right corner of the first scan line 252 and a second point 264 is placed on the bottom left corner of the third scan line 256, as shown in FIG. 26b. By subtracting the lateral positions of these two points, a determination of the width of the bottom of the trench 228 is made. Next, a first point 266 is placed on the portion of the scan line representing the bottom of the trench and a second point 268 is placed out of the trench, step 74, as shown in FIG. 26c. By subtracting the vertical positions of these two points, a determination of the depth of the trench 228 is made, step 75. By selecting the right sidewall profile 270 of the first scan line 252 and the left sidewall profile 272 of the third scan line 256 or by selecting the right sidewall profile 270 and the left sidewall profile 272 of the second line scan 254 the sidewall profiles are extracted, step 76. By selecting either the bottom profile 274 of the first scan line 252 or the bottom profile 274 of the third scan line 256 the bottom profile of the trench is extracted, step 77. The bottom profile of the trench 228 is employed to determine the average roughness of the bottom of the trench.

Figure 27:
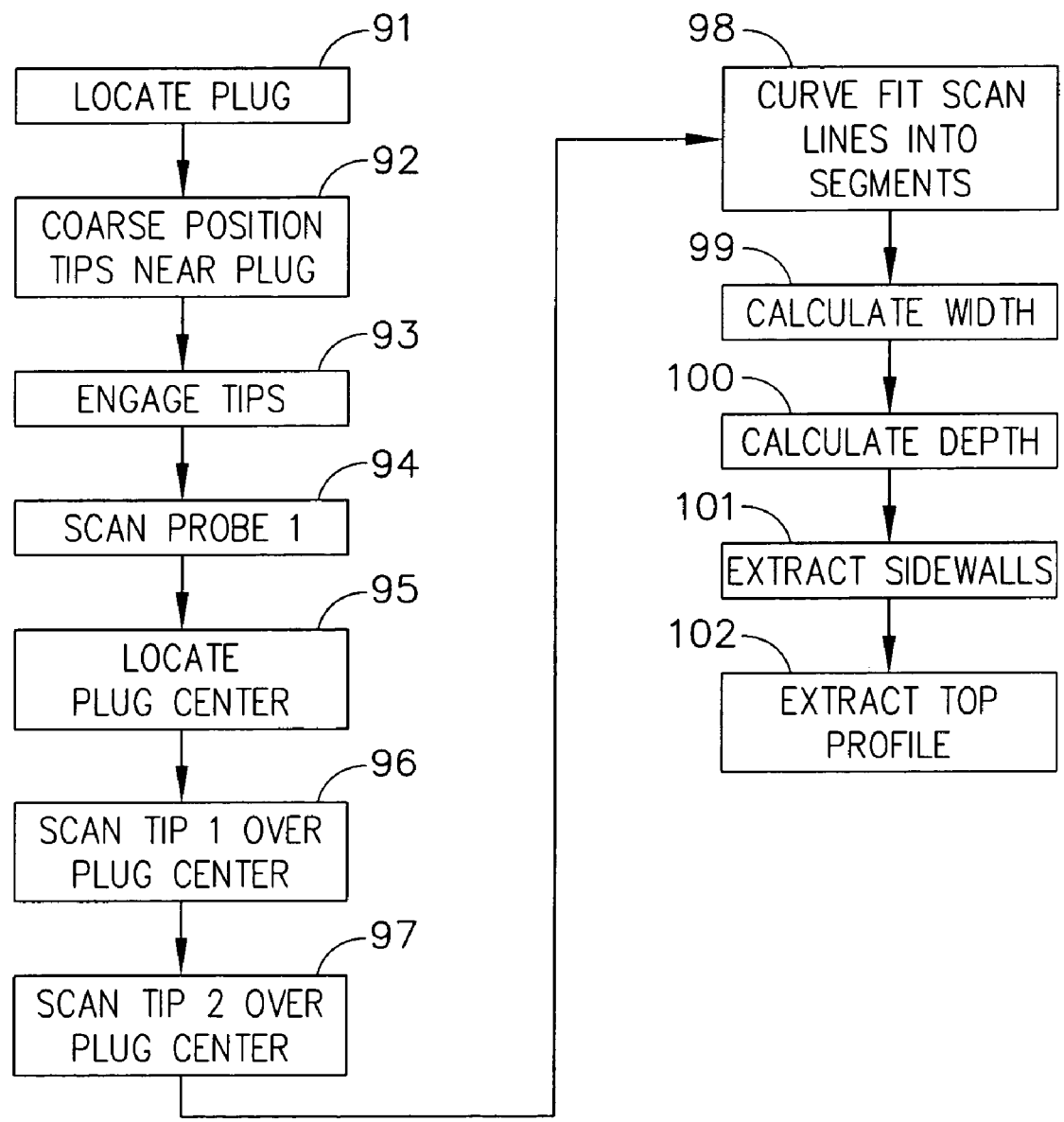
FIG. 27 is a flowchart of the operation of a fourth embodiment of the invention.
Figure 28:
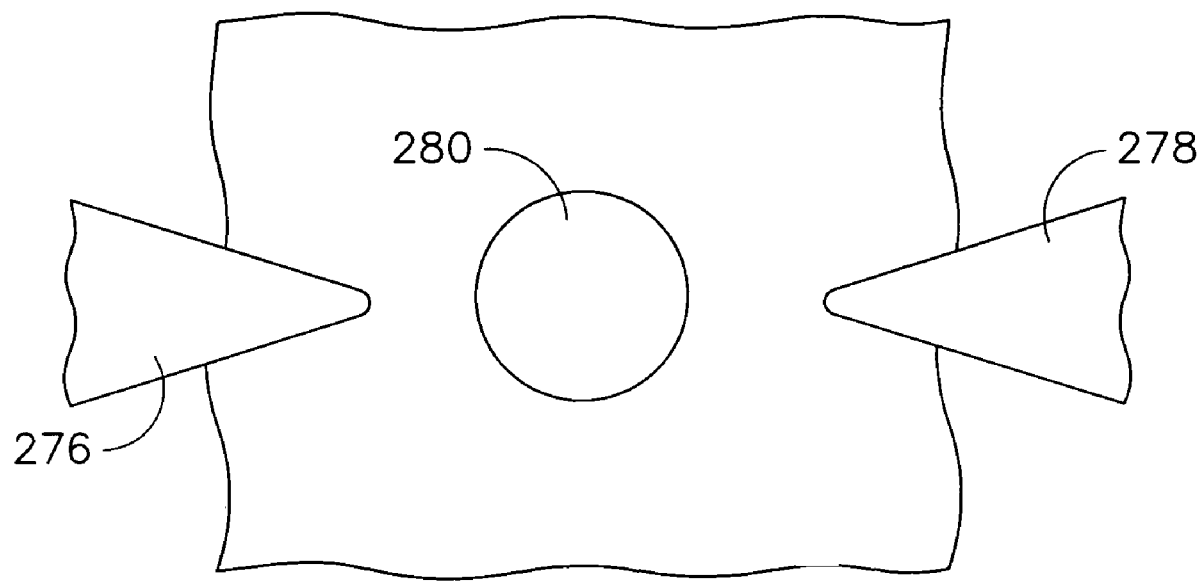
FIG. 28 shows a first probe tip positioned near a plug as a feature of interest.

FIG. 27 shows a flowchart of the operation of a fourth embodiment. Representative views of the topography and elements of the invention are shown in FIGS. 28-31d for explanation with the flowchart. A plug is located for measurement in step 91 and a first tip 276 and a second tip 278 are positioned near the plug 280, step 92. The plug 280 has near vertical sidewalls for the example shown. The first tip and the second tip are both conical, silicon tips that have been coated with gold. FIG. 28 shows the tips coarsely positioned over the plug.

Figure 29A:
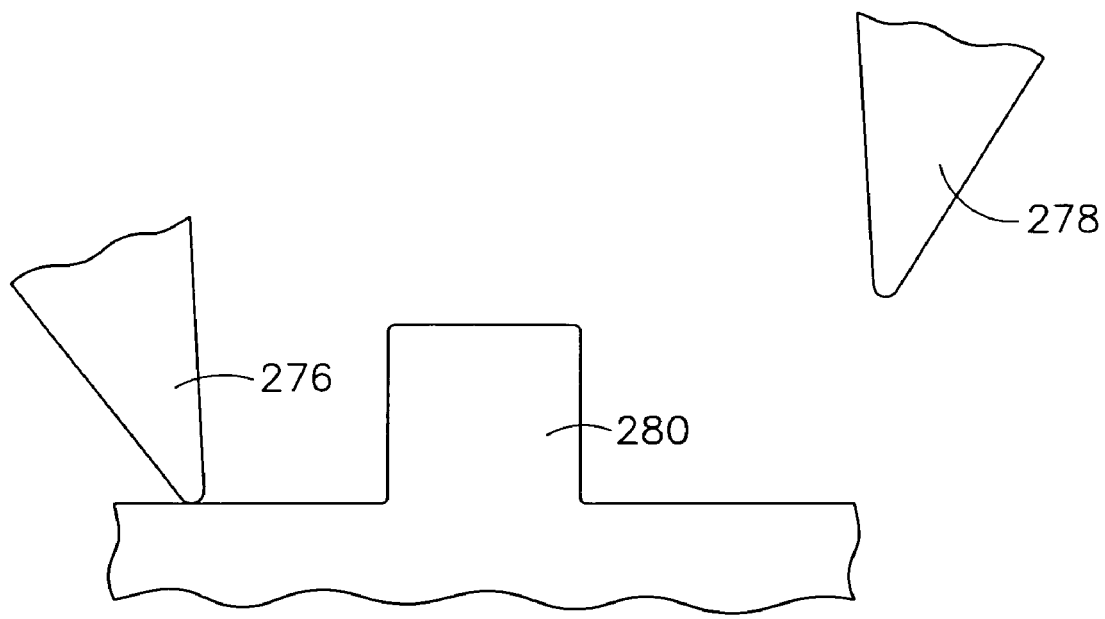
FIG. 29a depicts scanning by the first probe tip.
Figure 29B:
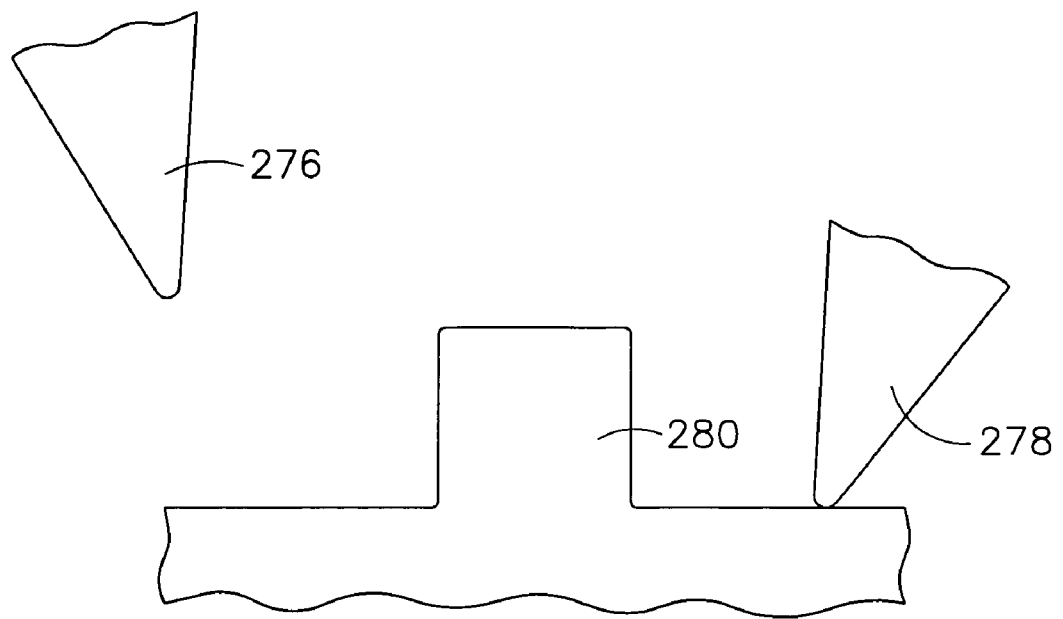
FIG. 29b depicts scanning by a second probe tip.

Both tips are oscillated at the resonance frequency of the cantilever, and engaged on the surface using constant-amplitude force feedback, step 93. The first tip 276 scans an image over the plug, step 94, as shown in FIG. 29a, and then uses the scan data to locate the plug center, step 95, and scan over the plug center, step 96. Then using the locational information from the first tip 276, the second tip 278 scans a single line over the plug, step 97, as shown in FIG. 29b.

Figure 30A:
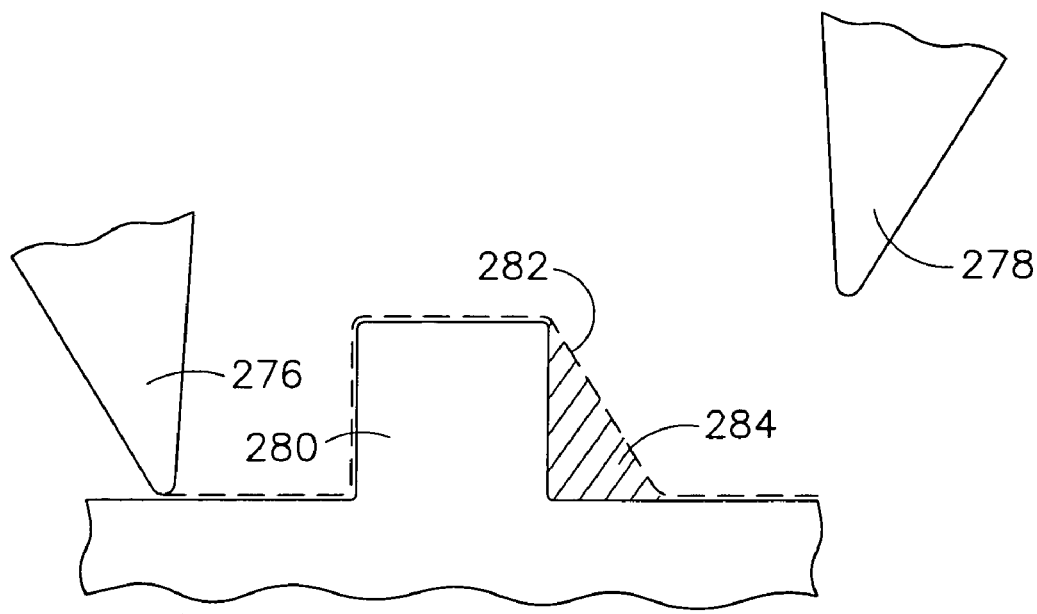
FIGS. 30a and 30b show scanning by the first and second probe tip producing tip artifacts.
Figure 30B:
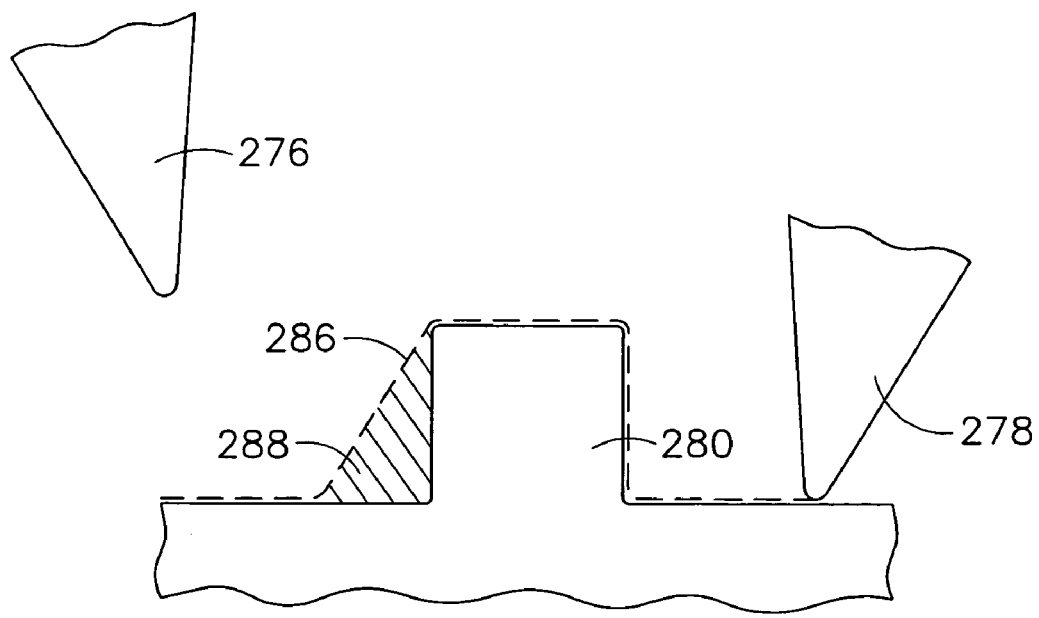
Figure 31A:
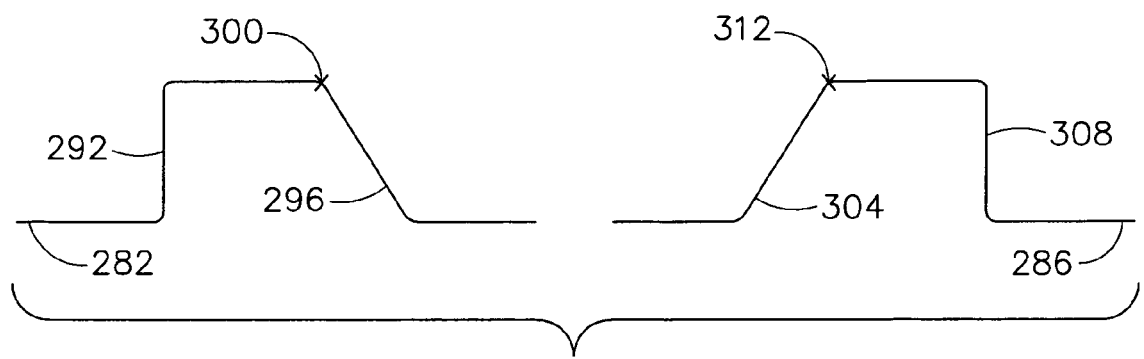
FIGS. 31a-31d demonstrate extraction of feature data from the scans of FIGS. 30a and 30b.
Figure 31B:
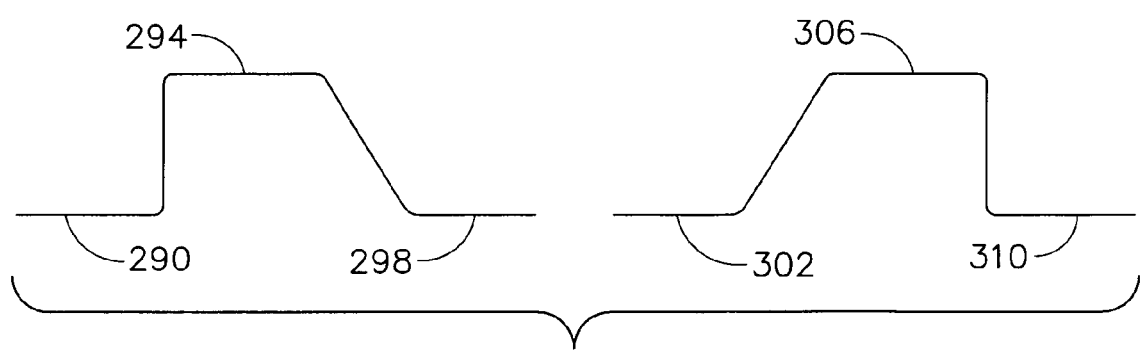
Figure 31C:
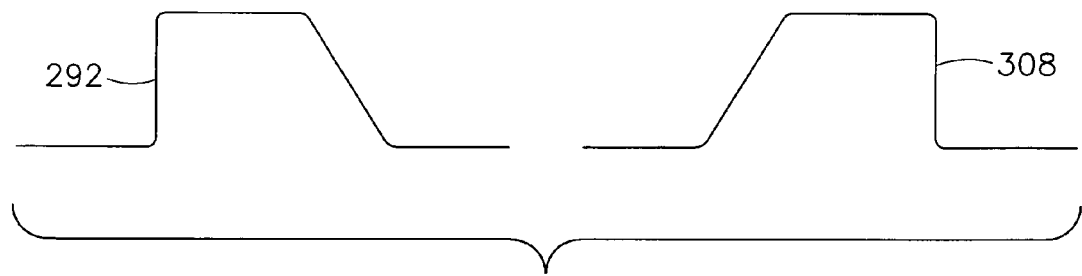
Figure 31D:
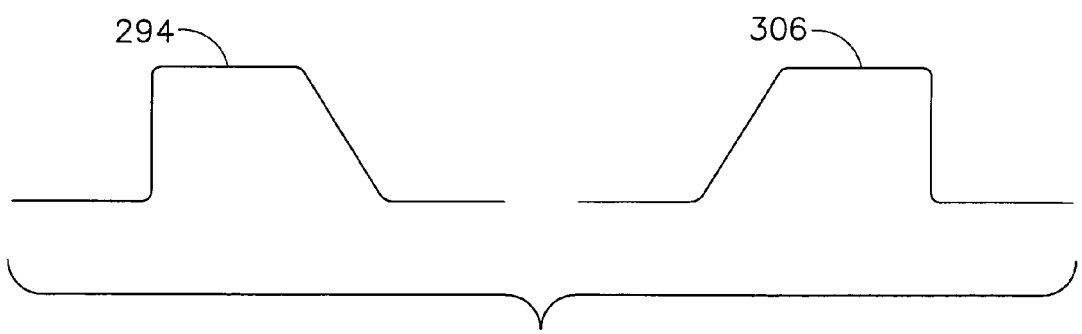

In this embodiment, the first tip is also equipped with a thermal sensing cantilever, and will gather thermal data in addition to topography data. Additionally, the first tip interleaves scans in the air above the sample to conduct electric force microscopy (EFM) in addition to gathering topography data The tips scan over the plug, scanning only a single line. The only image collected in this embodiment is the first image gathered by the first tip to locate the center of the plug. The topography data obtained by each tip will contain tip artifacts because of the interactions between the tip and the plug. FIG. 30a shows the first tip 276 scanning over the plug 280, producing scan data 282 that contains tip artifacts 284. FIG. 30b shows the second tip 278 scanning over the plug 280, also producing scan data 286 that contains tip artifacts 288.

The system automatically breaks the scan data into segments using curve fitting for the first tip 276, step 98. The segments are labeled left bottom 290, left sidewall 292, top 294, right sidewall 296 and right bottom 298. The system uses the left sidewall 292 and the highest point of the right sidewall 300 from the scan data 282 taken by the first tip 276 to determine the width of the plug 280 as measured by the first tip, step 99, shown in FIG. 31a. Similarly, the system automatically breaks the scan data into segments using curve fitting for the second tip 278 in step 98. The segments are also labeled left bottom 302, left sidewall 304, top 306, right sidewall 308 and right bottom 310. The system uses the right sidewall 308 and the highest point of the left sidewall 312 from the scan data 286 taken by the second tip 278 to determine the width of the plug 280 as measured by the second tip 278, step 99, shown in FIG. 31a. The system subtracts the average height value of the top 294 for the first tip from the average height value of the left bottom 290 and right bottom 298 for the first tip to obtain the height of the plug 280 for the first tip, step 100, shown in FIG. 31b. The system subtracts the average height value of the top 306 for the second tip from the average height value of the left bottom 302 and right bottom 310 for the second tip to obtain the height of the plug 280 for the second tip. The system automatically extracts the left sidewall 292 from the first tip and the right sidewall 308 from the second tip, step 101, shown in FIG. 31c. The system also automatically extracts the top 294 from the first tip and the top 306 from the second tip, step 102, shown in FIG. 31d.

Figure 32:
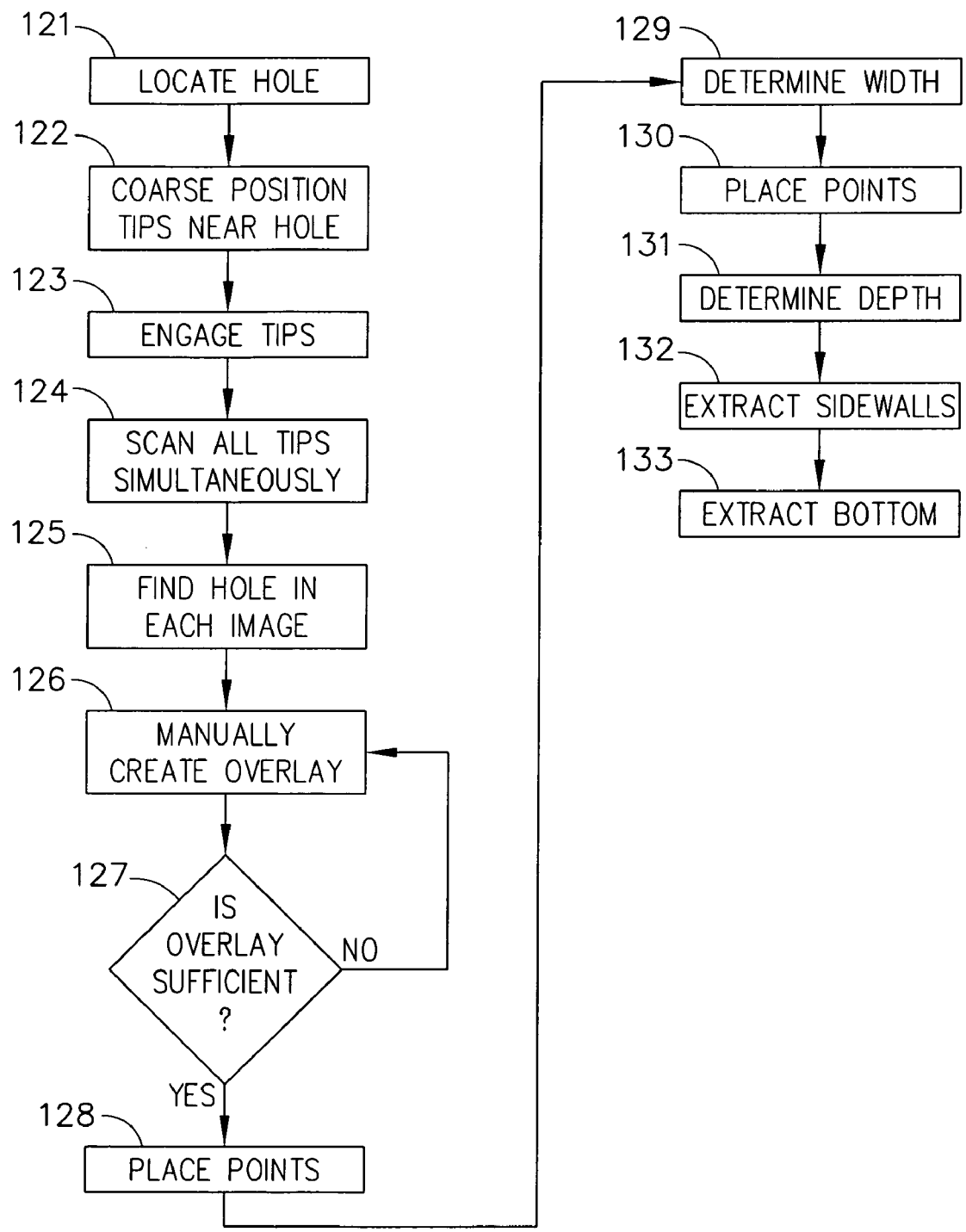
FIG. 32 shows a flowchart for the operation of a fifth embodiment of the invention.
Figure 33:
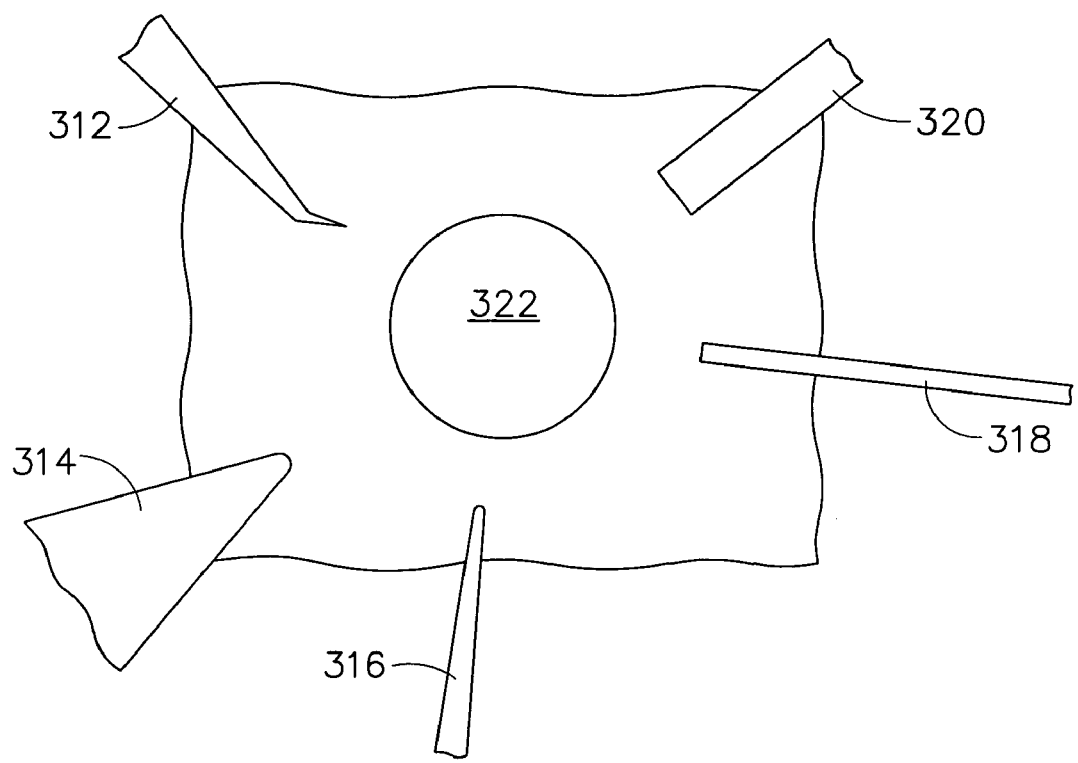
FIG. 33 shows probe tips coarsely positioned near a hole as a selected feature of interest.

FIG. 32 shows a flowchart for the operation of a fifth embodiment. Representative views of the topography and elements of the invention are shown in FIGS. 33-37f for explanation with the flowchart. A hole to be characterized is roughly located, step 121 and a first tip 312, a second tip 314, a third tip 316, a forth tip 318, and a fifth tip 320 are all positioned near a hole 322 that will be measured, step 122. The first tip 312 is a conical, tungsten tip that has been bent. The second tip 314 is a conical, tungsten tip. The third tip 316 is a conical, tungsten tip. The forth probe 318 is a nanotube. The fifth tip 320 is a cylindrical, tungsten tip. FIG. 33 shows the tips coarsely positioned near the hole 322 that will be measured.

Figure 34:
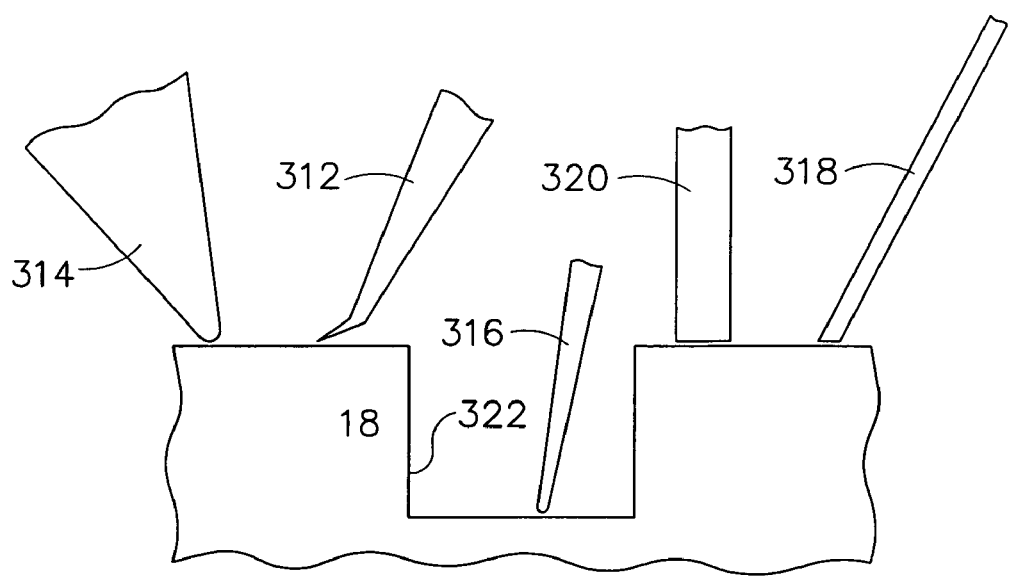
FIG. 34 shows the tips engaged on the surface using constant-deflection, force feedback.
Figure 35:
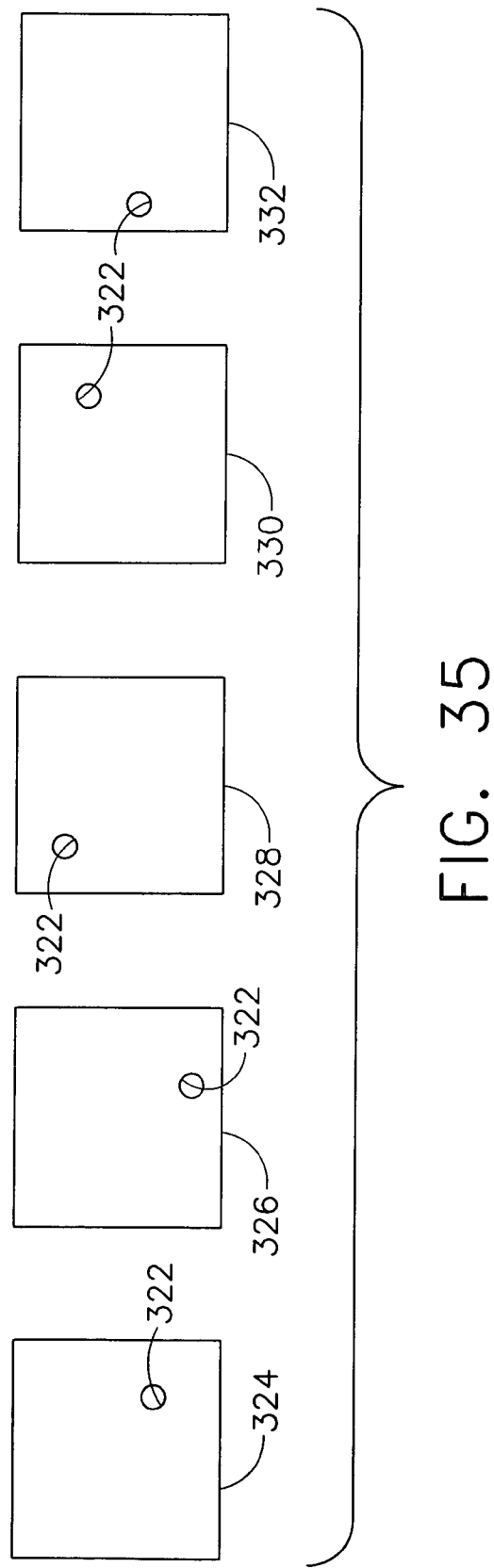
FIG. 35 shows topography images as all of the tips then scan simultaneously over the sample.

All of the tips are engaged on the surface using constant-deflection, force feedback, step 123, as shown in FIG. 34. All of the tips then scan simultaneously over the sample while gathering only topography data, step 124. All of the tips will gather complete topography images, as shown in FIG. 35. The hole 322 is located in each image 324, 326, 328, 330, 332, and the corresponding scan data is selected for analysis of the hole, step 125.

Figure 36A:
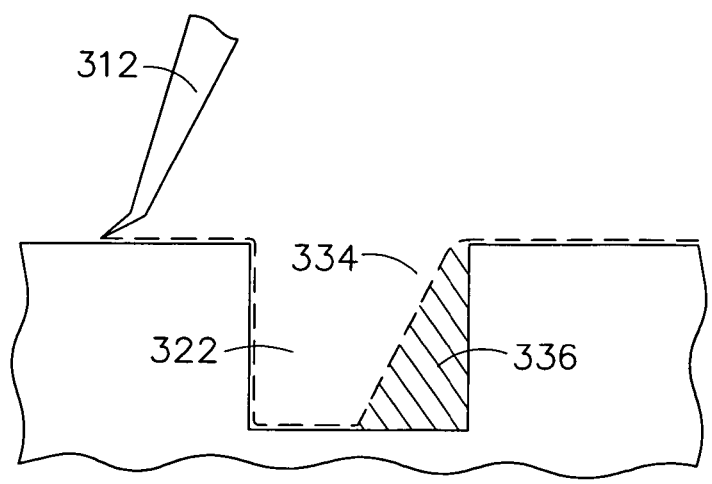
FIGS. 36a-36e show five tips scanning over the hole feature.
Figure 36B:
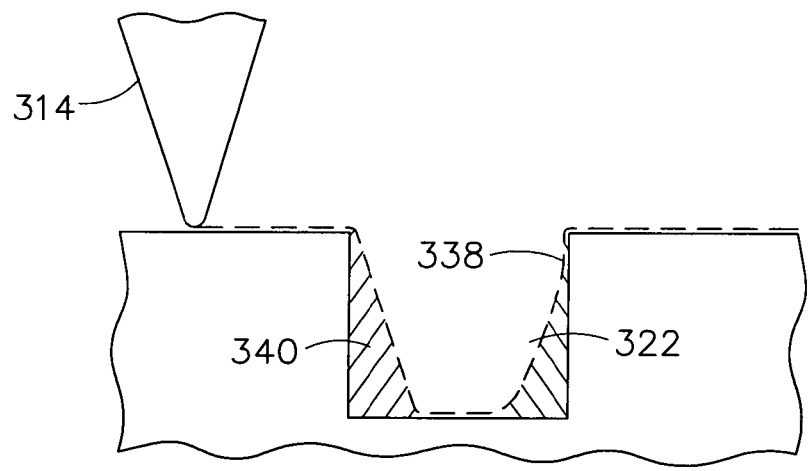
Figure 36C:
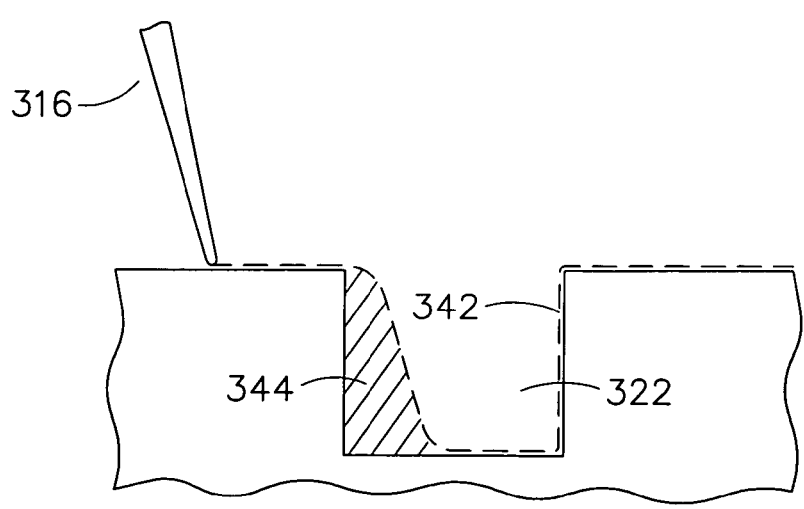
Figure 36D:
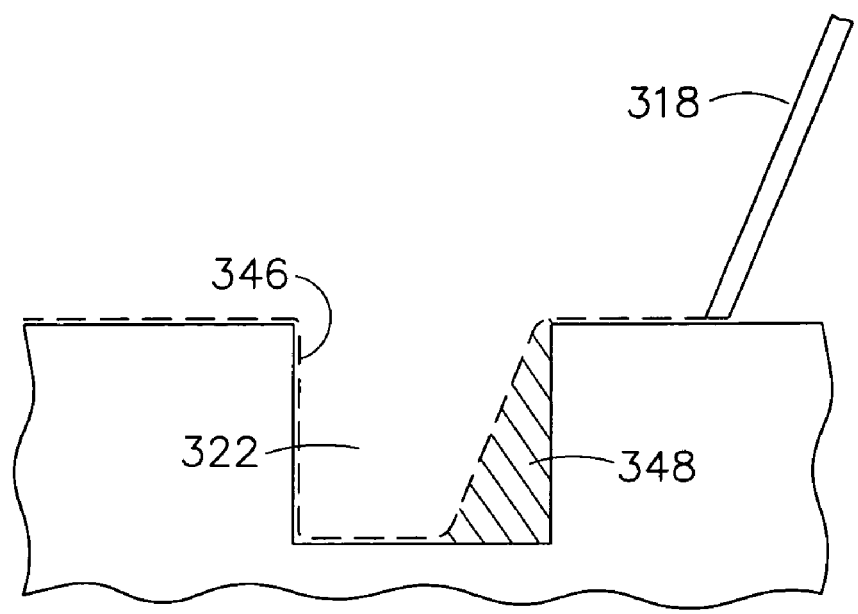
Figure 36E:
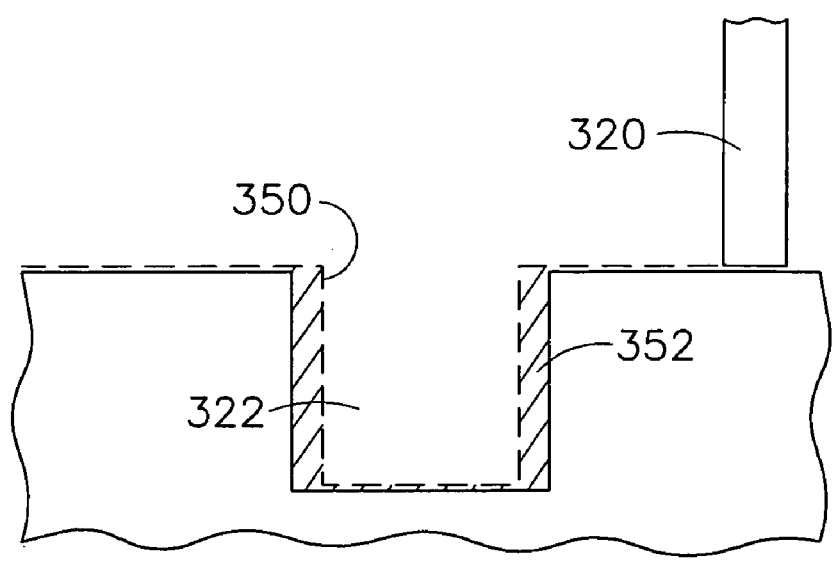

FIG. 36a shows the first tip 312 scanning over the hole 322 producing scan data 334 that contains tip artifacts 336. FIG. 36b shows the second tip 314 scanning over the hole 322 producing scan data 338 that contains tip artifacts 340. FIG. 36c shows the third tip 316 scanning over the hole 322 producing scan data 342 that contains tip artifacts 344. FIG. 36d shows the fourth tip 318 scanning over the hole 322 producing scan data 346 that contains tip artifacts 348. FIG. 36e shows the fifth tip 320 scanning over the hole 322 producing scan data 350 that contains tip artifacts 352.

Figure 37A:
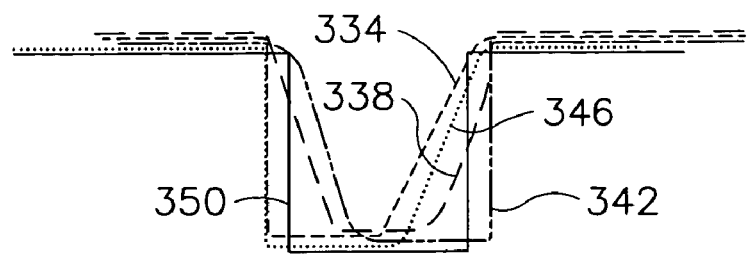
FIGS. 37a-37f show feature extraction of the hole.

The first scan line, the second scan line, third scan line, fourth scan line and the fifth scan line are placed on top of one another to create an overlay, step 126. The scan lines are moved until a satisfactory overlay is obtained, step 127. FIG. 37a shows the scan lines after being overlaid.

Figure 37B:
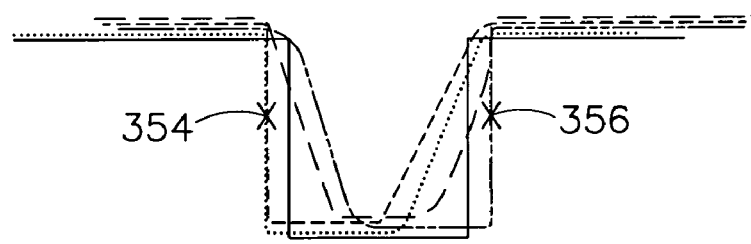
Figure 37C:
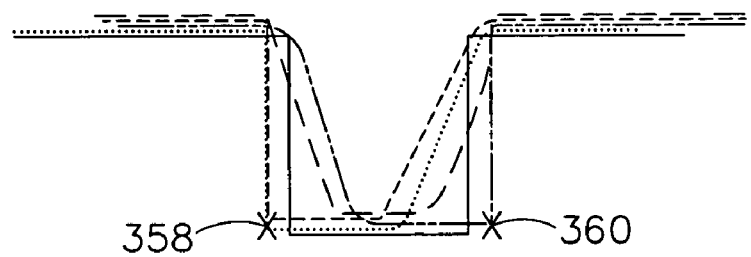
Figure 37D:
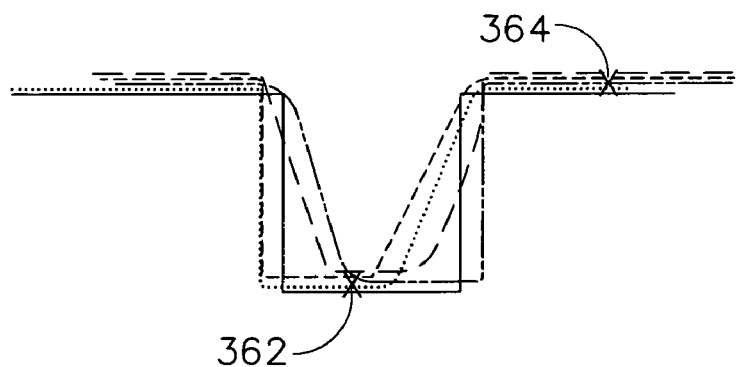
Figure 37E:
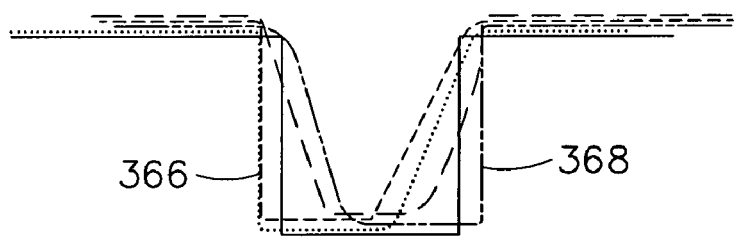
Figure 37F:
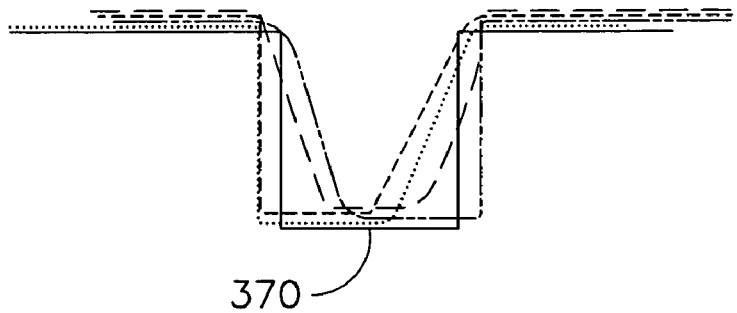

A first point 354 is placed on the overlay representing the left-most sidewall, and a second point 356 on the overlay representing right-most sidewall, step 128. Placing the points near the top and subtracting the lateral positions of the two points will determine the width of the top of the hole, step 129, as shown in FIG. 37b. Placing the first point 358 and the second point 360 near the bottom and subtracting the lateral positions of the two points determines the width of the bottom of the hole, as shown in FIG. 37c. A first point 362 then placed outside of the hole and a second point 364 at the bottom most segment inside the hole, step 130, as shown in FIG. 37d. The vertical position of the two points is subtracted to determine the depth of the hole, step 131. The left sidewall 366 is extracted by selecting the left-most sidewall scan of the hole and the right sidewall 368 is extracted by selecting the right-most sidewall scan of the hole, step 132, as shown in FIG. 37e. The bottom 370 of the hole is extracted by selecting the bottom-most segments in the bottom of the hole, step 133 as shown in FIG. 37f.

The invention embodiments include different tip geometries. The specific type of tip used is not a limitation of the invention. The different tips may have very different or substantially similar geometries. In addition to variations in conical tip sizes, taper angles and end radii, other tip geometries include FIB milled spike tips, cylindrical tips, boot tips, bent tips and nanotube tips.

The invention embodiments include a variety of tip materials. The specific type of material is not a limitation of the invention. The probes may be constructed of any material capable of making a good quality AFM tip. Examples of some possible materials to construct AFM tips include silicon, silicon nitride, metal coated silicon, tungsten, tungsten carbide, tungsten, rhenium and carbon nanotubes.

The invention does also not depend to the specific manner in which the scanning probe tip is scanned over the feature. The prior art contains many means of scanning a probe over a surface. An embodiment of the invention has the probes in a deflection only mode, also called no force feedback or profilometry. Contact mode, or DC deflection feedback is another embodiment, as is Non-contact mode or AC amplitude or AC frequency feedback. Capacitive feedback, torsional DC feedback, torsional AC feedback or scanning tunnel microscopy (STM) are also examples of feedback methods for the scanning probe in the invention.

An additional enablement in the prior art that can be applied in concert with the current invention involves feeding the gathered scan data back into the height control for the scanned probe such that the scanned probe repeats the topography of the measured feature, with an offset. A proprietary name held by Veeco Instruments for this technique is Lift-Mode™. This technique can be used in combination with the current invention to measure the feature of interest without tip artifacts, and then perform an additional measurement. Examples of such measurements in the prior art include magnetic force microscopy (MFM) and electric force microscopy (EFM).

The current invention also allows the scanning probe to take additional measurements concurrently with the sidewall measurement. The scanned probes can each perform any number of techniques enabled in the prior art. Examples of these techniques include measuring current, magnetics, capacitance, resistance, phase and temperature.

The given embodiments of the invention focus on samples from the semiconductor industry, such as trenches and lines. However, the invention may be applied to remove tip artifacts from many different samples. Examples of these are from the semiconductor industry such as holes, plugs, and edge FETs. Also, examples of devices from other fields include nanotubes and nanotech devices, micro-fluidic channels and devices and MEMs devices.

Figure 38A:
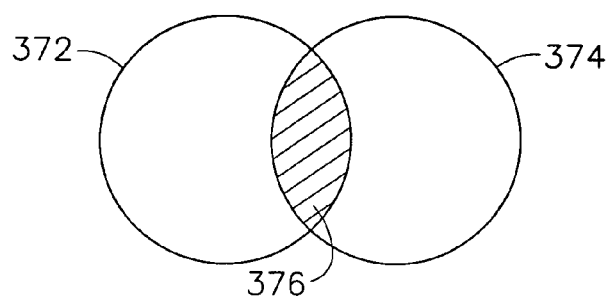
FIG. 38a shows a typical example of a Venn diagram of an intersection.
Figure 38B:
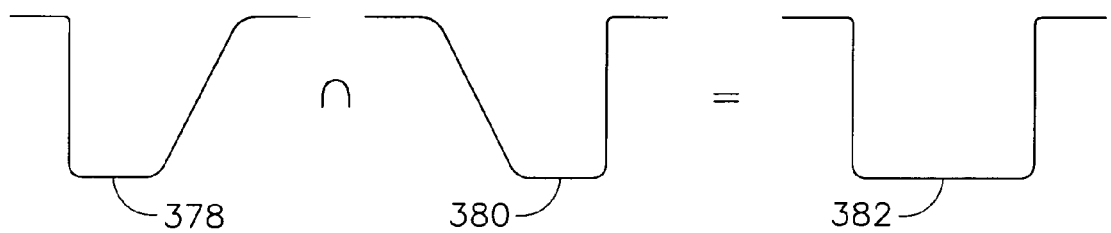
FIG. 38b shows the intersection of a first scan line of a trench containing tip artifacts and a second scan line of the trench containing tip artifacts.
Figure 38C:
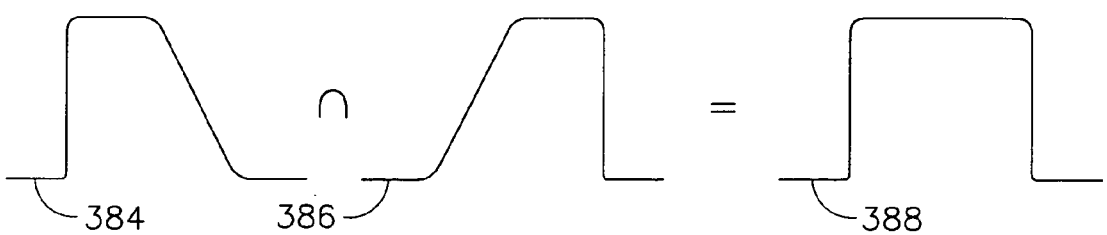
FIG. 38c shows the intersection of a first scan line of a line containing tip artifacts and a second scan line of the line containing tip artifacts; and, FIGS. 39a-39c demonstrate tips with dimensions too large to conduct desired measurements.

The logical operation of intersection for extracting profiles from the combined probe scans is well known to one skilled in the art, but it is worth reviewing here. The intersection operation will take a subset of two or more sets, that where the subset is common to all of the sets. The typical example of a Venn diagram shows a first set 372 and a second set 374. The intersection subset 376 is shown in FIG. 38a. Similarly, FIG. 38b shows the intersection of a first scan line 378 of a trench containing tip artifacts and a second scan line 380 of the trench containing tip artifacts. The intersection scan line 382 is shown, which has removed the tip artifacts, as disclosed in the invention. FIG. 38c shows the intersection of a first scan line 384 of a line containing tip artifacts and a second scan line 386 of the line containing tip artifacts. The intersection scan line 388 is shown, which has removed the tip artifacts, as disclosed in the invention.

Figure 39A:
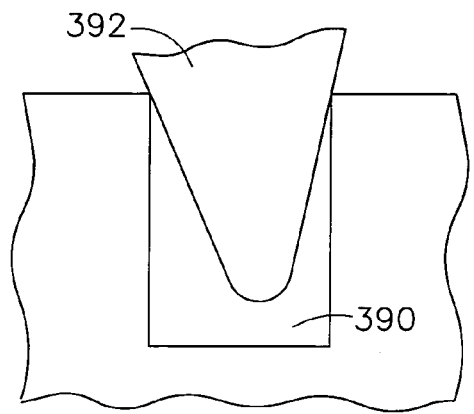
Figure 39B:
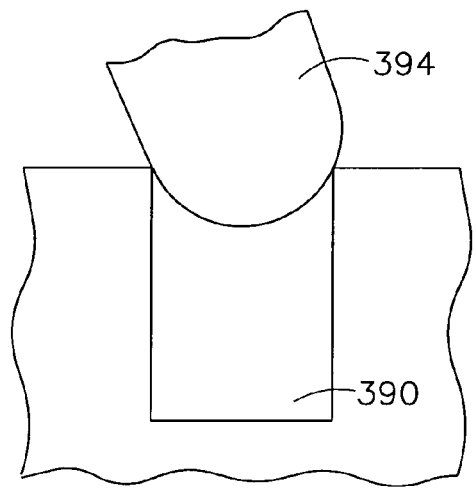
Figure 39C:
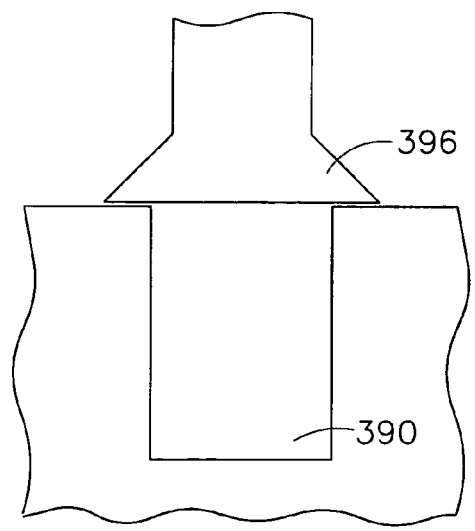

One shortcoming to the prior art of scanning with a single tip is that the tip may be too large to enter a feature of interest, such as a trench 390. This is shown for a tip with too large of a taper angle 392 in FIG. 39a, too large of an end radius 394 in FIG. 39b and too large of a boot end 396 in FIG. 39c. Because the current invention uses multiple probes, if this situation occurs, a sharper probe can be used to create a scan, as disclosed in the embodiments previously described, to continue the measurement.

Figure 40A:
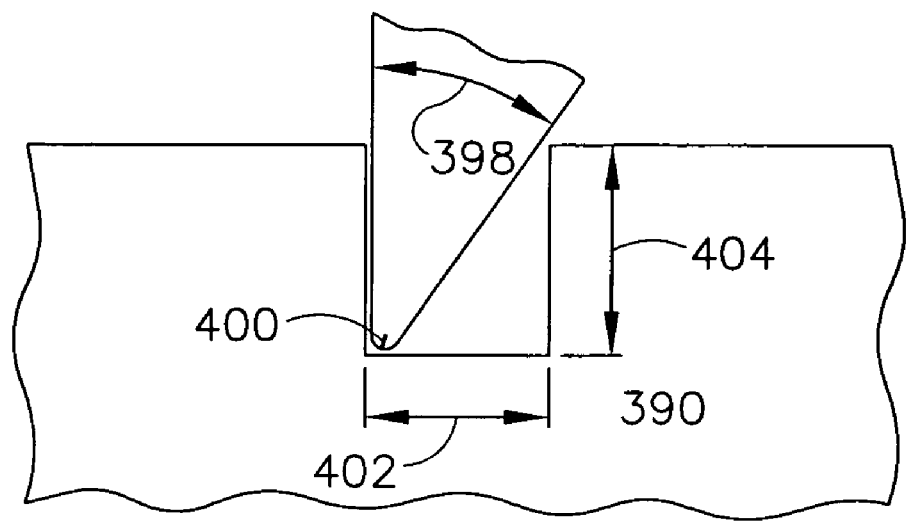
FIGS. 40a and 40b show the maximum sized tips to measure just the sidewall, or the base and the sidewall of a trench using the invention.

A given conical probe capable of measuring just the sidewall is shown in FIG. 40a. Given a conical scanning probe of entrant angle 398 ($\phi$), end radius 400 (R) and width 402 (w), for a sidewall only measurement, the tip is capable of measuring a trench 390 of depth 404 (d), given by:

$$d = R + \frac{w - R - \frac{R}{\cos(\phi)}}{\tan(\phi)}$$

Figure 40B:
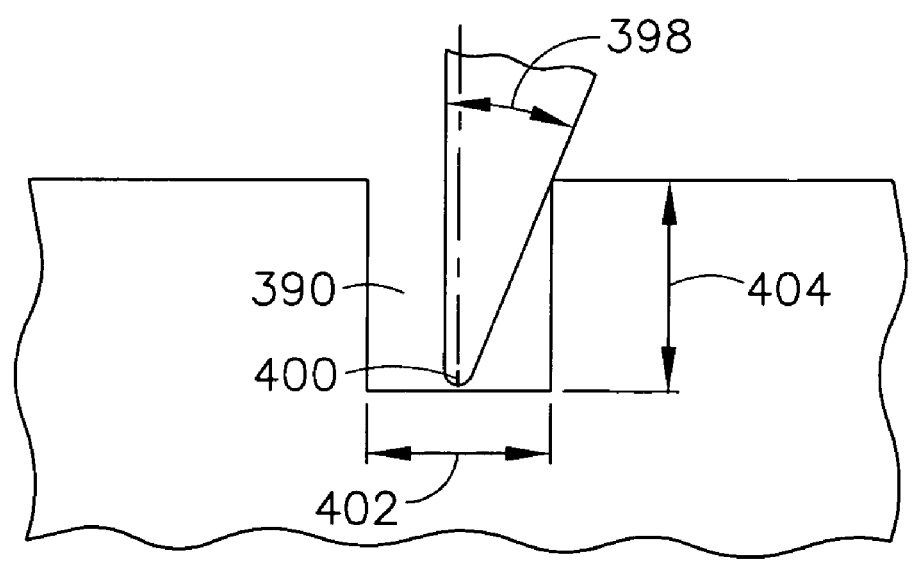

Similarly, a given conical probe capable of measuring the sidewall and half of the bottom of a trench is shown in FIG. 40b. Given a conical probe of entrant angle 398 ($\phi$), end radius 400 (R) and width 402 (w) and assuming R<w/2, then for a sidewall and surface roughness measurement of half of the trench 390 bottom the tip is capable of measuring a trench 390 of depth 404 (d), given by:

$$d = R + \frac{\frac{w}{2} - \frac{R}{\cos(\phi)}}{\tan(\phi)}$$

The invention employs these relationships in embodiments used to measure the other half of the trench bottom and the other sidewall by using a tip of similar geometry and of opposite orientation.

Having now described the invention in detail as required by the patent statutes, those skilled in the art will recognize modifications and substitutions to the specific embodiments disclosed herein. Such modifications are within the scope and intent of the present invention as summarized below.

What is claimed is:

1. A scanning probe microscopy system for a feature with the potential to produce artifacts based on probe geometry comprising:
   at least two scanning probes, said probes having differing measurement characteristics;
   means for moving the scanning probes, said moving means adapted to receive motion control signals for scanning the probes to avoid interference in scanning a substantially identical portion of a feature;
   means for generating image scan data from input signals from each probe for a substantially identical portion of the feature; and,
   means for displaying the generated scan data for the probes to compensate for artifacts to produce a corrected image of the substantially identical portion of the feature.

2. A scanning probe microscopy system as defined in claim 1 wherein the differing measurement characteristics comprise substantially different orientation of each probe.

3. A scanning probe microscopy system as defined in claim 2 wherein the probes have substantially similar geometries.

4. A scanning probe microscopy system as defined in claim 2 wherein each of the probes is mounted on a separate moving means.

5. A scanning probe microscopy system as defined in claim 1 wherein the differing measurement characteristics comprise substantially different geometry of each probe.

6. A scanning probe microscopy system as defined in claim 5 wherein the probes have substantially the same orientation and the probes are mounted on separate moving means.

7. A scanning probe microscopy system as defined in claim 1 wherein the means for displaying the generated scan data comprises means to display each set of scan data separately.

8. A scanning probe microscopy system as defined in claim 1 wherein the means for displaying the generated scan data comprises means to overlay the scan data.

9. A scanning probe microscopy system as defined in claim 5 wherein the means for combining the generated image scan data comprises means for creating an intersection of the image scan data.

10. A scanning probe measurement as defined in claim 1 where the feature to be scanned is a semiconductor trench and the means for combining the generated image scan data comprises means for creating an intersection of the image scan data.

11. A scanning probe measurement as defined in claim 1 where the feature to be scanned is a semiconductor line and the means for combining the generated image scan data comprises means for creating an intersection of the image scan data.

12. A scanning probe microscopy system for semiconductor trench features comprising:
    at least two scanning probes, said probes having substantially opposite orientation relative to a device under test;
    means for moving the scanning probes in concert, said moving means adapted to receive motion control signals for scanning the probes to avoid interference in scanning a substantially identical portion of a feature;
    means for generating image scan data from input signals from each probe for a substantially identical portion of the feature; and,
    means for creating an overlay of the generated image scan data for the two probes to produce a corrected image of the substantially identical portion of the feature.

13. A method for scanning probe microscopy of a feature with the potential to produce artifacts based on probe geometry comprising the steps of:
    attaching a first probe to a motion control means;
    determining a scan pattern for the first probe, said pattern including the feature;
    attaching a second probe having a differing measurement characteristic to a second motion control means;
    determining an offset scan pattern for the second probe based on the scan pattern for the first probe, said offset scan pattern also including the feature to avoid interference in scanning a substantially identical portion of a feature;
    driving the motion control means and second motion control means for simultaneous scanning of the first and second probes based on the determined scan pattern and offset scan pattern;
    generating image scan data from input from each probe for a substantially identical portion of the feature; and,
    combining the generated image scan data from the first probe and second probe to compensate for any artifacts to produce a corrected image of the substantially identical portion of the feature.

14. A method as defined in claim 13 wherein the differing measurement characteristic is created by the initial step of:
    positioning the second probe in an orientation substantially different from the first probe.

15. A method as defined in claim 13 wherein the differing measurement characteristic is created by the initial step of:

selecting a second probe with a substantially different geometry from the first probe.

16. A method for scanning probe microscopy of a feature with the potential to produce artifacts based on probe geometry comprising the steps of:
 providing a first tip and a second tip each mounted on and controlled by a separate SPM;
 locating a trench for characterization;
 positioning the first and second tips near the trench;
 engaging the first tip and the second tip on the sample by their respective SPMs using a constant-deflection, force feedback;
 scanning the first tip and second tip substantially simultaneously over the trench, gathering topography data with the first tip and second tip while scanning;
 providing a first topography image from the first tip of a portion of the trench and a second topography image from the second tip for the same portion of the trench that contain tip artifacts due to interactions between the tip and the trench;
 checking the images for alignment;
 rotating the scan angle of the second SPM so the trench has the same orientation in the first topography image and in the second topography image;
 determining if the trench is perpendicular to the scan;
 rotating the scan angle of the SPM connected to the first tip and the scan angle of the SPM connected to the second tip together so the tips scan perpendicular across the trench;
 selecting a first scan line from the first tip and a second scan line from the second tip from the image data;
 displaying the first scan line and a second scan line of the trench;
 selecting a first point on the first scan line that is at the top left corner of the trench and a second point on the first scan line that is at the top right corner of the trench in the scan line;
 selecting a first point on the second scan line which is at the top left corner of the trench in the scan line and a second point on the second scan line that is at the top right corner of the trench in the scan line;
 placing the first point on the first scan line and the first point on the second scan line at the same location, and by placing the second point on the first scan line and the second point on the second scan line at the same location to overlay the scan lines on the same graph;
 repeating the selection of a first point and a second point on both scan lines until the overlay is accurate
 combining the scan lines into one data set to extract the data that represents the trench and removes the data that contains the tip artifacts by the logical operation of intersection;
 placing as indices a first point on the left sidewall and a second point on the right sidewall of the combined scan line of the trench;
 subtracting the lateral positions of the two points for a determination of the width of the trench;
 placing as indices a first point at the top of the trench and a second point at the bottom of the trench on the combined scan line;
 subtracting the vertical position of the two points to determine the depth of the trench; and,
 using the resulting data corrected for the tip artifacts extracting the shape of the sidewalls and the bottom profile.

* * * * *